United States Patent [19]
Takeuchi et al.

[11] Patent Number: 5,488,595
[45] Date of Patent: Jan. 30, 1996

[54] OPTICAL INFORMATION RECORDING MEDIUM HAVING A TRANSITIONING THREE BIT ACCESS PIT GROUP AND OPTICAL INFORMATION RECORDING/REPRODUCING APPARATUS USING THE SAME

[75] Inventors: Takashi Takeuchi; Tadashi Saitoh, both of Fujisawa; Toshihiro Matsunaga, Kamakura; Masashi Mori, Chigasaki; Hajime Fujiya, Kamakura, all of Japan

[73] Assignees: Hitachi, Ltd., Tokyo; Hitachi Video Engineering, Inc., Kanagawa, both of Japan

[21] Appl. No.: 123,978

[22] Filed: Sep. 21, 1993

Related U.S. Application Data

[63] Continuation of Ser. No. 511,800, Apr. 20, 1990, abandoned.

[30] Foreign Application Priority Data

Apr. 24, 1989 [JP] Japan .................................. 1-101634
Dec. 15, 1989 [JP] Japan .................................. 1-323756

[51] Int. Cl.$^6$ ...................................................... G11B 7/00
[52] U.S. Cl. ...................... 369/54; 369/44.26; 369/275.3; 369/32; 369/44.28
[58] Field of Search .............................. 369/44.13, 44.26, 369/275.5, 44.11, 44.28, 44.34, 44.39, 32, 48, 54, 59, 116, 275.1, 275.4, 275.3

[56] References Cited

U.S. PATENT DOCUMENTS

| | | | |
|---|---|---|---|
| 4,967,403 | 10/1990 | Ogawa et al. | 369/44.26 |
| 5,008,669 | 4/1991 | Ishihashi et al. | 369/59 |
| 5,063,546 | 11/1991 | Ito et al. | 369/44.26 |
| 5,099,467 | 3/1992 | Sumihiro et al. | 369/275.3 |
| 5,117,402 | 5/1992 | Ito et al. | 369/275.3 |
| 5,239,530 | 8/1993 | Seo et al. | 369/32 |
| 5,321,675 | 6/1994 | Ito et al. | 369/44.28 |

FOREIGN PATENT DOCUMENTS

| | | | |
|---|---|---|---|
| 63-225924 | 9/1988 | Japan | 369/44.13 |
| 63-313325 | 12/1988 | Japan | 369/44.13 |

OTHER PUBLICATIONS

Proceeding of JPIE, vol. 695, Optical Mass Data Storage, II, 1986, pp. 112–115, 239–242.

*Primary Examiner*—Nabil Z. Hindi
*Attorney, Agent, or Firm*—Antonelli, Terry, Stout & Kraus

[57] ABSTRACT

A disk-like optical information recording medium in/from which information can be optically recorded/reproduced along a virtual track virtually defined in a spiral or concentric circular form on the recording medium is provided with a pair of wobbling pits provided for each predetermined data record unit and shifted in position in opposite senses of a radius direction with respect to a virtual track center and a group of at least two pits provided at specified positions in association with a leading one of the paired wobbling pits. The pit group forms together with the leading wobbling pit a mark following a predetermined modulation rule applied upon recording of information and changes between tracks adjacent to each other in the radius direction. An apparatus for recording/reproducing information in/from the recording medium includes an optical system for irradiating the recording medium with write-in light modulated in accordance with externally inputted recording information and irradiating the recording medium with reproduction light to detect light reflected therefrom, a detecting and decoding circuit inputted with a detection output of the optical system for detecting a position of the mark on the basis of a decoding method corresponding to the predetermined modulation rule, and a movement amount detecting circuit inputted with the mark position from the detecting and decoding circuit for detecting a change in relative position between a reproduced position on the recording medium and the optical system.

9 Claims, 27 Drawing Sheets

FIG. 5A

|  | EVEN-NUMBERED |  | ODD-NUMBERED |
|---|---|---|---|
| DATA | MODULATED PATTERN | DATA | MODULATED PATTERN |
| DATA(HEX) | 12345678901 | DATA(HEX) | 12345678901 |
| 0 (000) | `     11 11  ` | 1 (001) | `11 11      ` |
| 2 (002) | `    111̄ 1  ` | 3 (003) | `1 1̄11      ` |
| 4 (004) | `    1 1 1̄1 ` | 5 (005) | `11̄ 1 1     ` |
| 6 (006) | `    1 1̄1 1 ` | 7 (007) | `1 1̄1 1     ` |
| 8 (008) | `    1 111̄  ` | 9 (009) | ` 111 1     ` |
| 10 (00A) | `   11̄   11̄ ` | 11 (00B) | `11̄   11̄    ` |
| 12 (00C) | `   11 1̄ 1  ` | 13 (00D) | `1 1̄ 11     ` |
| 14 (00E) | `   11 11̄   ` | 15 (00F) | ` 11 11     ` |
| 16 (010) | `   111̄  1  ` | 17 (011) | `1   1̄11    ` |
| 18 (012) | `   111  1  ` | 19 (013) | ` 1 111     ` |
| 20 (014) | `   1   1 1̄1` | 21 (015) | `11̄ 1   1   ` |
| 22 (016) | `   1   1̄1 1` | 23 (017) | `1 1̄1   1   ` |
| 24 (018) | `   1   111̄ ` | 25 (019) | ` 111   1   ` |
| 26 (01A) | `   1 1̄  11̄ ` | 27 (01B) | `11̄ 1 1̄     ` |
| 28 (01C) | `   1 1̄ 1̄ 1 ` | 29 (01D) | `1 1̄ 1 1̄    ` |
| 30 (01E) | `   1 1 1̄1̄ ` | 31 (01F) | ` 11̄ 1 1    ` |
| 32 (020) | `   1 11̄  1 ` | 33 (021) | `1   1̄1 1   ` |
| 34 (022) | `   1 11  1 ` | 35 (023) | ` 1  11 1   ` |
| 36 (024) | `   1  111̄  ` | 37 (025) | ` 111   1   ` |
| 38 (026) | `   11̄   11̄ ` | 39 (027) | `11̄    11̄   ` |
| 40 (028) | `   11  1 1 ` | 41 (029) | `1 1   11   ` |
| 42 (02A) | `   11  11̄  ` | 43 (02B) | ` 11   11   ` |
| 44 (02C) | `   11 1̄  1̄ ` | 45 (02D) | `1   1̄ 11   ` |
| 46 (02E) | `   11 1  1 ` | 47 (02F) | ` 1 1 11    ` |
| 48 (030) | `   11 11̄   ` | 49 (031) | `  11 11    ` |
| 50 (032) | `   111̄    1` | 51 (033) | `1     1̄11  ` |
| 52 (034) | `   111    1` | 53 (035) | ` 1    111  ` |
| 54 (036) | `   111  1̄  ` | 55 (037) | ` 1  111    ` |
| 56 (038) | `  1   1 1̄1 ` | 57 (039) | `11̄ 1     1 ` |
| 58 (03A) | `  1   11̄ 1 ` | 59 (03B) | `1 1̄1     1 ` |
| 60 (03C) | `  1   111̄  ` | 61 (03D) | ` 111    1  ` |
| 62 (03E) | `  1  1  11̄ ` | 63 (03F) | `11̄  1  1   ` |

FIG. 5B

| DATA (HEX) | MODULATED PATTERN<br>12345678901 | DATA (HEX) | MODULATED PATTERN<br>12345678901 |
|---|---|---|---|
| 64(040) | `  1  1 1 1 ` | 65(041) | `1 1 1  1   ` |
| 66(042) | `  1  1 1̄1 ` | 67(043) | ` 1̄1 1  1  ` |
| 68(044) | `  1 1̄1  1̄` | 69(045) | `1 1̄1   1  ` |
| 70(046) | `  1  11 1̄` | 71(047) | ` 1 11  1  ` |
| 72(048) | `  1  111̄ ` | 73(049) | `  1̄11  1  ` |
| 74(04A) | `  1 1̄  11̄` | 75(04B) | `1̄1   1̄ 1  ` |
| 76(04C) | `  1 1̄ 1̄ 1` | 77(04D) | `1 1̄  1 1  ` |
| 78(04E) | `  1 1̄ 11̄ ` | 79(04F) | `1̄1   1 1  ` |
| 80(050) | `  1 1 1̄ 1̄` | 81(051) | `1̄ 1̄1 1   ` |
| 82(052) | `  1 1 1̄1 ` | 83(053) | ` 1̄1 1 1   ` |
| 84(054) | `  1 1 11̄ ` | 85(055) | ` 1̄1 1  1  ` |
| 86(056) | `  1 11̄  1̄` | 87(057) | `1̄  1̄1 1   ` |
| 88(058) | `  1 11  1̄` | 89(059) | `1  11 1    ` |
| 90(05A) | `  1 11 1̄ ` | 91(05B) | ` 1̄ 11 1   ` |
| 92(05C) | `  1 111̄  ` | 93(05D) | `  1̄11 1   ` |
| 94(05E) | `  11̄   11̄` | 95(05F) | `1̄1    1̄1  ` |
| 96(060) | `  11  1̄ 1̄` | 97(061) | `1 1̄   11  ` |
| 98(062) | `  11  1̄1 ` | 99(063) | ` 1̄1   11  ` |
| 100(064) | `  11 1̄  1̄` | 101(065) | `1̄  1̄  11  ` |
| 102(066) | `  11 1̄ 1̄ ` | 103(067) | ` 1̄1̄   11  ` |
| 104(068) | `  11 11̄  ` | 105(069) | ` 1̄ 1̄  11  ` |
| 106(06A) | `  111̄   1̄` | 107(06B) | `1̄    1̄11  ` |
| 108(06C) | `  111̄  1̄ ` | 109(06D) | `1̄ 1̄   11  ` |
| 110(06E) | `  11 1̄1̄  ` | 111(06F) | ` 1̄ 1̄  11  ` |
| 112(070) | `  111    1̄` | 113(071) | `1̄    1̄11  ` |
| 114(072) | `  111   1̄ ` | 115(073) | ` 1̄   111  ` |
| 116(074) | `  111  1̄  ` | 117(075) | `  1̄  111  ` |
| 118(076) | ` 1̄   1 11̄ ` | 119(077) | `1̄1 1̄   1  ` |
| 120(078) | ` 1̄   11̄ 1 ` | 121(079) | `1 1̄    1̄ 1̄` |
| 122(07A) | ` 1̄   111̄  ` | 123(07B) | ` 1̄11   1  ` |
| 124(07C) | ` 1̄  1 11̄  ` | 125(07D) | `1̄1 1    1̄ ` |
| 126(07E) | ` 1̄  1 1 1̄ ` | 127(07F) | `1 1̄ 1   1̄ ` |

FIG. 5C

| DATA (HEX) | MODULATED PATTERN (positions 1234567890 11) | DATA (HEX) | MODULATED PATTERN (positions 1234567890 11) |
|---|---|---|---|
| 128 (080) | `_1___1_11_` | 129 (081) | `_11_1____1_` |
| 130 (082) | `_1___1\bar{1}__\bar{1}_` | 131 (083) | `\bar{1}_\bar{1}1____1_` |
| 132 (084) | `_1___11_\bar{1}_` | 133 (085) | `_\bar{1}_11___1_` |
| 134 (086) | `_1___11\bar{1}__` | 135 (087) | `__\bar{1}11___1_` |
| 136 (088) | `_1__1___11_` | 137 (089) | `11___1___1_` |
| 138 (08A) | `_1__1__\bar{1}_1_` | 139 (08B) | `1_\bar{1}__1___1_` |
| 140 (08C) | `_1__1_\bar{1}1__` | 141 (08D) | `_\bar{1}1__1__1_` |
| 142 (08E) | `_1__1_\bar{1}_\bar{1}_` | 143 (08F) | `\bar{1}__\bar{1}_1__1_` |
| 144 (090) | `_1_1___1_1_` | 145 (091) | `_\bar{1}_1__1__1_` |
| 146 (092) | `_1_1__1\bar{1}__` | 147 (093) | `__\bar{1}1_1__1_` |
| 148 (094) | `_1_1\bar{1}___\bar{1}_` | 149 (095) | `\bar{1}___\bar{1}1__1_` |
| 150 (096) | `_1_11___\bar{1}_` | 151 (097) | `_\bar{1}_11__1_` |
| 152 (098) | `_1_11_\bar{1}__` | 153 (099) | `__\bar{1}11__1_` |
| 154 (09A) | `_1\bar{1}___1\bar{1}__` | 155 (09B) | `11____\bar{1}_1_` |
| 156 (09C) | `_1_1__\bar{1}_1_` | 157 (09D) | `1_\bar{1}__\bar{1}_1_` |
| 158 (09E) | `_1_1_\bar{1}\bar{1}__` | 159 (09F) | `\bar{1}\bar{1}___\bar{1}1_` |
| 160 (0A0) | `_1_1_\bar{1}_\bar{1}_` | 161 (0A1) | `\bar{1}_\bar{1}__\bar{1}_1_` |
| 162 (0A2) | `_1_1__\bar{1}\bar{1}_` | 163 (0A3) | `\bar{1}\bar{1}__\bar{1}1_` |
| 164 (0A4) | `_1_1_\bar{1}1__` | 165 (0A5) | `_\bar{1}\bar{1}__\bar{1}1_` |
| 166 (0A6) | `_1\bar{1}\bar{1}___\bar{1}_` | 167 (0A7) | `\bar{1}__\bar{1}_\bar{1}_1_` |
| 168 (0A8) | `_1_1_1__\bar{1}_` | 169 (0A9) | `1_\bar{1}_1__\bar{1}_` |
| 170 (0AA) | `_1\bar{1}_\bar{1}___1_` | 171 (0AB) | `\bar{1}___\bar{1}\bar{1}_1_` |
| 172 (0AC) | `_1\bar{1}1___1_` | 173 (0AD) | `_\bar{1}__\bar{1}\bar{1}_1_` |
| 174 (0AE) | `_\bar{1}\bar{1}____\bar{1}\bar{1}_` | 175 (0AF) | `\bar{1}\bar{1}____\bar{1}\bar{1}_` |
| 176 (0B0) | `_\bar{1}\bar{1}____1_1_` | 177 (0B1) | `1_1____\bar{1}1_` |
| 178 (0B2) | `_\bar{1}\bar{1}___1\bar{1}__` | 179 (0B3) | `\bar{1}\bar{1}____1\bar{1}__` |
| 180 (0B4) | `_\bar{1}\bar{1}__1___\bar{1}_` | 181 (0B5) | `\bar{1}__\bar{1}____\bar{1}1_` |
| 182 (0B6) | `_\bar{1}\bar{1}__1_\bar{1}__` | 183 (0B7) | `\bar{1}_\bar{1}___\bar{1}1__` |
| 184 (0B8) | `_\bar{1}\bar{1}_1___1_` | 185 (0B9) | `\bar{1}__\bar{1}___\bar{1}1_` |
| 186 (0BA) | `_\bar{1}\bar{1}_1_\bar{1}___` | 187 (0BB) | `\bar{1}_\bar{1}___\bar{1}1__` |
| 188 (0BC) | `_\bar{1}\bar{1}\bar{1}___\bar{1}__` | 189 (0BD) | `\bar{1}___\bar{1}_\bar{1}1__` |
| 190 (0BE) | `_\bar{1}\bar{1}\bar{1}__\bar{1}___` | 191 (0BF) | `_\bar{1}___\bar{1}_\bar{1}1__` |

FIG. 5D

| DATA | MODULATED PATTERN | DATA | MODULATED PATTERN |
|---|---|---|---|
| DATA (HEX) | `12345678901` (11) | DATA (HEX) | `12345678901` (11) |
| 192 (0C0) | `  111     1` | 193 (0C1) | `1    111  ` |
| 194 (0C2) | ` 111    1 ` | 195 (0C3) | ` 1   111  ` |
| 196 (0C4) | `1     1 11` | 197 (0C5) | `11 1     1` |
| 198 (0C6) | `1     11 1` | 199 (0C7) | `1 11     1` |
| 200 (0C8) | `1      111` | 201 (0C9) | ` 111     1` |
| 202 (0CA) | `1    1  11` | 203 (0CB) | `11  1    1` |
| 204 (0CC) | `1    1 1 1` | 205 (0CD) | `1 1 1    1` |
| 206 (0CE) | `1    1 11 ` | 207 (0CF) | `11 1     1` |
| 208 (0D0) | `1     11 1` | 209 (0D1) | `1  11    1` |
| 210 (0D2) | `1    11 1 ` | 211 (0D3) | ` 1 11    1` |
| 212 (0D4) | `1   1   11` | 213 (0D5) | `11   1   1` |
| 214 (0D6) | `1   1  1 1` | 215 (0D7) | `1 1  1   1` |
| 216 (0D8) | `1   1   11` | 217 (0D9) | `11   1   1` |
| 218 (0DA) | `1   1 1  1` | 219 (0DB) | `1  1 1   1` |
| 220 (0DC) | `1    1 1 1` | 221 (0DD) | ` 1 1 1   1` |
| 222 (0DE) | `1   11   1` | 223 (0DF) | `1   11   1` |
| 224 (0E0) | `1   11  1 ` | 225 (0E1) | ` 1  11   1` |
| 226 (0E2) | `1 1    11 ` | 227 (0E3) | `11    1  1` |
| 228 (0E4) | `1 1   1 1 ` | 229 (0E5) | `1 1   1  1` |
| 230 (0E6) | `1 1    11 ` | 231 (0E7) | `11    1  1` |
| 232 (0E8) | `1 1   1 1 ` | 233 (0E9) | `1 1 1    1` |
| 234 (0EA) | `1 1    1 1` | 235 (0EB) | ` 11  1   1` |
| 236 (0EC) | `1 1 1   1 ` | 237 (0ED) | `1  11    1` |
| 238 (0EE) | `1 11    1 ` | 239 (0EF) | `1   11   1` |
| 240 (0F0) | `1 1     11` | 241 (0F1) | `11       11` |
| 242 (0F2) | `1 1    1 1` | 243 (0F3) | `1 1     11` |
| 244 (0F4) | `1 1     11` | 245 (0F5) | ` 11     11` |
| 246 (0F6) | `1 1    1 1` | 247 (0F7) | `1 1    1 1` |
| 248 (0F8) | `1 1   1  1` | 249 (0F9) | `1   1 1  1` |
| 250 (0FA) | `1 11     1` | 251 (0FB) | `1     111 ` |
| 252 (0FC) | `1 11     1` | 253 (0FD) | `1     11 1` |
| 254 (0FE) | `11       11` | 255 (0FF) | `11       11` |

TRACK TRANSITION DIRECTION →

| PATTERN | | | | | | | | | | | | | | | |
|---|---|---|---|---|---|---|---|---|---|---|---|---|---|---|---|
| No.1  | 14 | 13 | 10 | 5  | 4  | 1  | 2  | 3  | 6  | 9  | 8  | 11 | 12 | 15 | 18 | 17 |
| No.2  | 14 | 13 | 10 | 5  | 6  | 3  | 2  | 1  | 4  | 7  | 8  | 11 | 12 | 15 | 18 | 17 |
| No.3  | 14 | 13 | 16 | 17 | 18 | 15 | 12 | 11 | 8  | 5  | 4  | 1  | 2  | 3  | 6  | 9  |
| No.4  | 14 | 13 | 16 | 17 | 18 | 15 | 12 | 11 | 8  | 7  | 4  | 1  | 2  | 3  | 6  | 9  |
| No.5  | 14 | 13 | 16 | 17 | 18 | 15 | 12 | 11 | 8  | 7  | 4  | 5  | 2  | 3  | 6  | 9  |
| No.6  | 14 | 13 | 16 | 17 | 18 | 15 | 12 | 11 | 10 | 5  | 4  | 1  | 2  | 3  | 6  | 9  |
| No.7  | 14 | 13 | 16 | 17 | 18 | 15 | 12 | 11 | 10 | 5  | 2  | 1  | 4  | 7  | 8  | 9  |
| No.8  | 14 | 13 | 6  | 3  | 2  | 1  | 4  | 7  | 8  | 5  | 10 | 11 | 12 | 15 | 18 | 17 |
| No.9  | 14 | 13 | 6  | 9  | 8  | 7  | 4  | 1  | 2  | 5  | 10 | 11 | 12 | 15 | 18 | 17 |
| No.10 | 14 | 15 | 12 | 11 | 8  | 9  | 6  | 3  | 2  | 1  | 4  | 5  | 10 | 13 | 16 | 17 |
| No.11 | 14 | 15 | 12 | 11 | 10 | 5  | 2  | 1  | 4  | 7  | 8  | 9  | 6  | 13 | 16 | 17 |
| No.12 | 14 | 15 | 12 | 11 | 10 | 5  | 8  | 7  | 4  | 1  | 2  | 3  | 6  | 13 | 16 | 17 |
| No.13 | 14 | 15 | 18 | 17 | 16 | 13 | 10 | 5  | 4  | 1  | 2  | 3  | 6  | 9  | 8  | 11 |
| No.14 | 14 | 15 | 18 | 17 | 16 | 13 | 10 | 5  | 8  | 7  | 4  | 1  | 2  | 3  | 6  | 9  |
| No.15 | 14 | 15 | 18 | 17 | 16 | 13 | 10 | 11 | 8  | 7  | 4  | 1  | 2  | 3  | 6  | 9  |
| No.16 | 14 | 15 | 18 | 17 | 16 | 13 | 6  | 3  | 2  | 1  | 4  | 7  | 8  | 5  | 10 | 11 |
| No.17 | 14 | 15 | 18 | 17 | 16 | 13 | 6  | 3  | 2  | 1  | 4  | 5  | 10 | 11 | 8  | 9  |
| No.18 | 14 | 15 | 18 | 17 | 16 | 13 | 6  | 9  | 8  | 7  | 4  | 1  | 2  | 5  | 10 | 11 |
| No.19 | 14 | 9  | 6  | 13 | 10 | 5  | 2  | 1  | 4  | 7  | 8  | 11 | 12 | 15 | 18 | 17 |
| No.20 | 14 | 9  | 6  | 3  | 2  | 1  | 4  | 7  | 8  | 5  | 10 | 11 | 12 | 15 | 18 | 17 |
| No.21 | 14 | 9  | 8  | 7  | 4  | 1  | 2  | 3  | 6  | 13 | 10 | 11 | 12 | 15 | 18 | 17 |
| No.22 | 14 | 9  | 8  | 7  | 4  | 1  | 2  | 3  | 6  | 13 | 16 | 17 | 18 | 15 | 12 | 11 |

FIG. 11A

| | | | | | | | | | | | | | | | |
|---|---|---|---|---|---|---|---|---|---|---|---|---|---|---|---|
| No.1  | 0 | 1 | 2 | 3  | 6  | 9  | 14 | 15 | 19 | 18 | 17 | 16 | 13 | 10 | 5  | 4 |
| No.2  | 0 | 1 | 2 | 5  | 10 | 11 | 12 | 15 | 19 | 18 | 17 | 14 | 9  | 8  | 7  | 4 |
| No.3  | 0 | 4 | 7 | 8  | 9  | 14 | 17 | 18 | 19 | 15 | 12 | 11 | 10 | 5  | 2  | 1 |
| No.4  | 0 | 4 | 5 | 10 | 13 | 16 | 17 | 18 | 19 | 15 | 14 | 9  | 6  | 3  | 2  | 1 |
| No.5  | 1 | 2 | 3 | 6  | 5  | 10 | 11 | 12 | 18 | 17 | 16 | 13 | 14 | 9  | 8  | 7 |
| No.6  | 1 | 2 | 3 | 6  | 5  | 8  | 9  | 15 | 18 | 17 | 16 | 13 | 14 | 11 | 10 | 4 |
| No.7  | 1 | 2 | 3 | 6  | 5  | 8  | 12 | 15 | 18 | 17 | 16 | 13 | 14 | 11 | 7  | 4 |
| No.8  | 1 | 2 | 3 | 6  | 9  | 8  | 12 | 15 | 18 | 17 | 16 | 13 | 10 | 11 | 7  | 4 |
| No.9  | 1 | 2 | 3 | 6  | 9  | 14 | 15 | 12 | 18 | 17 | 16 | 13 | 10 | 5  | 4  | 7 |
| No.10 | 1 | 2 | 3 | 6  | 9  | 14 | 11 | 12 | 18 | 17 | 16 | 13 | 10 | 5  | 8  | 7 |
| No.11 | 1 | 2 | 3 | 9  | 14 | 11 | 12 | 15 | 18 | 17 | 16 | 10 | 5  | 8  | 7  | 4 |
| No.12 | 1 | 2 | 5 | 6  | 9  | 8  | 12 | 15 | 18 | 17 | 14 | 13 | 10 | 11 | 7  | 4 |
| No.13 | 1 | 4 | 7 | 8  | 5  | 10 | 16 | 17 | 18 | 15 | 12 | 11 | 14 | 9  | 3  | 2 |
| No.14 | 1 | 4 | 7 | 11 | 14 | 13 | 16 | 17 | 18 | 15 | 12 | 8  | 5  | 6  | 3  | 2 |
| No.15 | 1 | 4 | 7 | 11 | 10 | 13 | 16 | 17 | 18 | 15 | 12 | 8  | 9  | 6  | 3  | 2 |
| No.16 | 1 | 4 | 7 | 11 | 10 | 13 | 14 | 17 | 18 | 15 | 12 | 8  | 9  | 6  | 5  | 2 |
| No.17 | 1 | 4 | 10| 11 | 14 | 13 | 16 | 17 | 18 | 15 | 9  | 8  | 5  | 6  | 3  | 2 |
| No.18 | 1 | 7 | 8 | 5  | 10 | 13 | 16 | 17 | 18 | 12 | 11 | 14 | 9  | 6  | 3  | 2 |
| No.19 | 1 | 7 | 8 | 9  | 14 | 13 | 16 | 17 | 18 | 12 | 11 | 10 | 5  | 6  | 3  | 2 |
| No.20 | 1 | 7 | 4 | 5  | 10 | 13 | 16 | 17 | 18 | 12 | 15 | 14 | 9  | 6  | 3  | 2 |
| No.21 | 1 | 0 | 4 | 7  | 8  | 9  | 14 | 17 | 18 | 19 | 15 | 12 | 11 | 10 | 5  | 2 |
| No.22 | 1 | 0 | 4 | 5  | 10 | 13 | 16 | 17 | 18 | 19 | 15 | 14 | 9  | 6  | 3  | 2 |
| No.23 | 2 | 1 | 4 | 7  | 8  | 5  | 10 | 16 | 17 | 18 | 15 | 12 | 11 | 14 | 9  | 3 |
| No.24 | 2 | 1 | 4 | 7  | 11 | 14 | 13 | 16 | 17 | 18 | 15 | 12 | 8  | 5  | 6  | 3 |
| No.25 | 2 | 1 | 4 | 7  | 11 | 10 | 13 | 16 | 17 | 18 | 15 | 12 | 8  | 9  | 6  | 3 |
| No.26 | 2 | 1 | 4 | 7  | 11 | 10 | 13 | 14 | 17 | 18 | 15 | 12 | 8  | 9  | 6  | 5 |
| No.27 | 2 | 1 | 4 | 10 | 11 | 14 | 13 | 16 | 17 | 18 | 15 | 9  | 8  | 5  | 6  | 3 |
| No.28 | 2 | 1 | 7 | 8  | 5  | 10 | 13 | 16 | 17 | 18 | 12 | 11 | 14 | 9  | 6  | 3 |
| No.29 | 2 | 1 | 7 | 8  | 9  | 14 | 13 | 16 | 17 | 18 | 12 | 11 | 10 | 5  | 6  | 3 |
| No.30 | 2 | 1 | 7 | 4  | 5  | 10 | 13 | 16 | 17 | 18 | 12 | 15 | 14 | 9  | 6  | 3 |
| No.31 | 2 | 1 | 0 | 4  | 7  | 8  | 9  | 14 | 17 | 18 | 19 | 15 | 12 | 11 | 10 | 5 |
| No.32 | 2 | 1 | 0 | 4  | 5  | 10 | 13 | 16 | 17 | 18 | 19 | 15 | 14 | 9  | 6  | 3 |
| No.33 | 2 | 3 | 6 | 9  | 8  | 12 | 15 | 14 | 17 | 16 | 13 | 10 | 11 | 7  | 4  | 5 |
| No.34 | 2 | 3 | 6 | 9  | 14 | 15 | 12 | 11 | 17 | 16 | 13 | 10 | 5  | 4  | 7  | 8 |
| No.35 | 2 | 3 | 6 | 9  | 15 | 12 | 11 | 14 | 17 | 16 | 13 | 10 | 4  | 7  | 8  | 5 |
| No.36 | 2 | 5 | 4 | 7  | 11 | 10 | 13 | 16 | 17 | 14 | 15 | 12 | 8  | 9  | 6  | 3 |
| No.37 | 2 | 5 | 8 | 7  | 4  | 10 | 13 | 16 | 17 | 14 | 11 | 12 | 15 | 9  | 6  | 3 |
| No.38 | 2 | 8 | 7 | 4  | 5  | 10 | 13 | 16 | 17 | 11 | 12 | 15 | 14 | 9  | 6  | 3 |
| No.39 | 3 | 2 | 1 | 4  | 7  | 8  | 5  | 10 | 16 | 17 | 18 | 15 | 12 | 11 | 14 | 9 |
| No.40 | 3 | 2 | 1 | 4  | 7  | 11 | 14 | 13 | 16 | 17 | 18 | 15 | 12 | 8  | 5  | 6 |
| No.41 | 3 | 2 | 1 | 4  | 7  | 11 | 10 | 13 | 16 | 17 | 18 | 15 | 12 | 8  | 9  | 6 |
| No.42 | 3 | 2 | 1 | 4  | 10 | 11 | 14 | 13 | 16 | 17 | 18 | 15 | 9  | 8  | 5  | 6 |
| No.43 | 3 | 2 | 1 | 7  | 8  | 5  | 10 | 13 | 16 | 17 | 18 | 12 | 11 | 14 | 9  | 6 |
| No.44 | 3 | 2 | 1 | 7  | 8  | 9  | 14 | 13 | 16 | 17 | 18 | 12 | 11 | 10 | 5  | 6 |
| No.45 | 3 | 2 | 1 | 7  | 4  | 5  | 10 | 13 | 16 | 17 | 18 | 12 | 15 | 14 | 9  | 6 |

FIG. 11B

| | | | | | | | | | | | | | | | |
|---|---|---|---|---|---|---|---|---|---|---|---|---|---|---|---|
| No.46 | 3 | 2 | 1 | 0 | 4 | 5 | 10 | 13 | 16 | 17 | 18 | 19 | 15 | 14 | 9 | 6 |
| No.47 | 3 | 2 | 5 | 4 | 7 | 11 | 10 | 13 | 16 | 17 | 14 | 15 | 12 | 8 | 9 | 6 |
| No.48 | 3 | 2 | 5 | 8 | 7 | 4 | 10 | 13 | 16 | 17 | 14 | 11 | 12 | 15 | 9 | 6 |
| No.49 | 3 | 2 | 8 | 7 | 4 | 5 | 10 | 13 | 16 | 17 | 11 | 12 | 15 | 14 | 9 | 6 |
| No.50 | 4 | 1 | 2 | 3 | 6 | 5 | 8 | 9 | 15 | 18 | 17 | 16 | 13 | 14 | 11 | 10 |
| No.51 | 4 | 1 | 2 | 3 | 6 | 5 | 8 | 12 | 15 | 18 | 17 | 16 | 13 | 14 | 11 | 7 |
| No.52 | 4 | 1 | 2 | 3 | 6 | 9 | 8 | 12 | 15 | 18 | 17 | 16 | 13 | 10 | 11 | 7 |
| No.53 | 4 | 1 | 2 | 3 | 9 | 14 | 11 | 12 | 15 | 18 | 17 | 16 | 10 | 5 | 8 | 7 |
| No.54 | 4 | 1 | 2 | 5 | 6 | 9 | 8 | 12 | 15 | 18 | 17 | 14 | 13 | 10 | 11 | 7 |
| No.55 | 4 | 7 | 8 | 5 | 2 | 3 | 6 | 9 | 15 | 12 | 11 | 14 | 17 | 16 | 13 | 10 |
| No.56 | 4 | 7 | 8 | 2 | 3 | 6 | 9 | 14 | 15 | 12 | 11 | 17 | 16 | 13 | 10 | 5 |
| No.57 | 4 | 7 | 11 | 10 | 13 | 16 | 17 | 14 | 15 | 12 | 8 | 9 | 6 | 3 | 2 | 5 |
| No.58 | 4 | 7 | 1 | 2 | 3 | 6 | 9 | 14 | 15 | 12 | 18 | 17 | 16 | 13 | 10 | 5 |
| No.59 | 4 | 5 | 10 | 13 | 16 | 17 | 18 | 12 | 15 | 14 | 9 | 6 | 3 | 2 | 1 | 7 |
| No.60 | 4 | 5 | 10 | 13 | 16 | 17 | 11 | 12 | 15 | 14 | 9 | 6 | 3 | 2 | 8 | 7 |
| No.61 | 4 | 5 | 2 | 3 | 6 | 9 | 8 | 12 | 15 | 14 | 17 | 16 | 13 | 10 | 11 | 7 |
| No.62 | 4 | 0 | 1 | 2 | 3 | 6 | 9 | 14 | 15 | 19 | 18 | 17 | 16 | 13 | 10 | 5 |
| No.63 | 4 | 0 | 1 | 2 | 5 | 10 | 11 | 12 | 15 | 19 | 18 | 17 | 14 | 9 | 8 | 7 |
| No.64 | 4 | 10 | 13 | 16 | 17 | 14 | 11 | 12 | 15 | 9 | 6 | 3 | 2 | 5 | 8 | 7 |
| No.65 | 5 | 4 | 7 | 8 | 2 | 3 | 6 | 9 | 14 | 15 | 12 | 11 | 17 | 16 | 13 | 10 |
| No.66 | 5 | 4 | 7 | 1 | 2 | 3 | 6 | 9 | 14 | 15 | 12 | 18 | 17 | 16 | 13 | 10 |
| No.67 | 5 | 4 | 0 | 1 | 2 | 3 | 6 | 9 | 14 | 15 | 19 | 18 | 17 | 16 | 13 | 10 |
| No.68 | 5 | 6 | 3 | 2 | 1 | 4 | 7 | 11 | 14 | 13 | 16 | 17 | 18 | 15 | 12 | 8 |
| No.69 | 5 | 6 | 3 | 2 | 1 | 4 | 10 | 11 | 14 | 13 | 16 | 17 | 18 | 15 | 9 | 8 |
| No.70 | 5 | 6 | 3 | 2 | 1 | 7 | 8 | 9 | 14 | 13 | 16 | 17 | 18 | 12 | 11 | 10 |
| No.71 | 5 | 10 | 13 | 16 | 17 | 18 | 12 | 11 | 14 | 9 | 6 | 3 | 2 | 1 | 7 | 8 |
| No.72 | 5 | 10 | 11 | 12 | 18 | 17 | 16 | 13 | 14 | 9 | 8 | 7 | 1 | 2 | 3 | 6 |
| No.73 | 5 | 10 | 16 | 17 | 18 | 15 | 12 | 11 | 14 | 9 | 3 | 2 | 1 | 4 | 7 | 8 |
| No.74 | 5 | 2 | 1 | 4 | 7 | 11 | 10 | 13 | 14 | 17 | 18 | 15 | 12 | 8 | 9 | 6 |
| No.75 | 5 | 2 | 1 | 0 | 4 | 7 | 8 | 9 | 14 | 17 | 18 | 19 | 15 | 12 | 11 | 10 |
| No.76 | 5 | 2 | 3 | 6 | 9 | 15 | 12 | 11 | 14 | 17 | 16 | 13 | 10 | 4 | 7 | 8 |
| No.77 | 5 | 8 | 9 | 15 | 18 | 17 | 16 | 13 | 14 | 11 | 10 | 4 | 1 | 2 | 3 | 6 |
| No.78 | 5 | 8 | 7 | 4 | 1 | 2 | 3 | 9 | 14 | 11 | 12 | 15 | 18 | 17 | 16 | 10 |
| No.79 | 5 | 8 | 7 | 1 | 2 | 3 | 6 | 9 | 14 | 11 | 12 | 18 | 17 | 16 | 13 | 10 |
| No.80 | 5 | 8 | 12 | 15 | 18 | 17 | 16 | 13 | 14 | 11 | 7 | 4 | 1 | 2 | 3 | 6 |
| No.81 | 6 | 5 | 2 | 1 | 4 | 7 | 11 | 10 | 13 | 14 | 17 | 18 | 15 | 12 | 8 | 9 |
| No.82 | 6 | 3 | 2 | 1 | 4 | 7 | 11 | 10 | 13 | 16 | 17 | 18 | 15 | 12 | 8 | 9 |
| No.83 | 6 | 3 | 2 | 1 | 7 | 8 | 5 | 10 | 13 | 16 | 17 | 18 | 12 | 11 | 14 | 9 |
| No.84 | 6 | 3 | 2 | 1 | 7 | 4 | 5 | 10 | 13 | 16 | 17 | 18 | 12 | 15 | 14 | 9 |
| No.85 | 6 | 3 | 2 | 1 | 0 | 4 | 5 | 10 | 13 | 16 | 17 | 18 | 19 | 15 | 14 | 9 |
| No.86 | 6 | 3 | 2 | 5 | 4 | 7 | 11 | 10 | 13 | 16 | 17 | 14 | 15 | 12 | 8 | 9 |
| No.87 | 6 | 3 | 2 | 5 | 8 | 7 | 4 | 10 | 13 | 16 | 17 | 14 | 11 | 12 | 15 | 9 |
| No.88 | 6 | 3 | 2 | 8 | 7 | 4 | 5 | 10 | 13 | 16 | 17 | 11 | 12 | 15 | 14 | 9 |
| No.89 | 7 | 4 | 1 | 2 | 3 | 6 | 5 | 8 | 12 | 15 | 18 | 17 | 16 | 13 | 14 | 11 |
| No.90 | 7 | 4 | 1 | 2 | 3 | 6 | 9 | 8 | 12 | 15 | 18 | 17 | 16 | 13 | 10 | 11 |

FIG. 11C

| | | | | | | | | | | | | | | | | |
|---|---|---|---|---|---|---|---|---|---|---|---|---|---|---|---|---|
| No.91  | 7 | 4  | 1  | 2  | 3  | 9  | 14 | 11 | 12 | 15 | 18 | 17 | 16 | 10 | 5  | 8  |
| No.92  | 7 | 4  | 1  | 2  | 5  | 6  | 9  | 8  | 12 | 15 | 18 | 17 | 14 | 13 | 10 | 11 |
| No.93  | 7 | 4  | 5  | 10 | 13 | 16 | 17 | 11 | 12 | 15 | 14 | 9  | 6  | 3  | 2  | 8  |
| No.94  | 7 | 4  | 5  | 2  | 3  | 6  | 9  | 8  | 12 | 15 | 14 | 17 | 16 | 13 | 10 | 11 |
| No.95  | 7 | 4  | 0  | 1  | 2  | 5  | 10 | 11 | 12 | 15 | 19 | 18 | 17 | 14 | 9  | 8  |
| No.96  | 7 | 4  | 10 | 13 | 16 | 17 | 14 | 11 | 12 | 15 | 9  | 6  | 3  | 2  | 5  | 8  |
| No.97  | 7 | 1  | 2  | 3  | 6  | 5  | 10 | 11 | 12 | 18 | 17 | 16 | 13 | 14 | 9  | 8  |
| No.98  | 7 | 1  | 2  | 3  | 6  | 9  | 14 | 11 | 12 | 18 | 17 | 16 | 13 | 10 | 5  | 8  |
| No.99  | 8 | 5  | 6  | 3  | 2  | 1  | 4  | 10 | 11 | 14 | 13 | 16 | 17 | 18 | 15 | 9  |
| No.100 | 8 | 7  | 4  | 0  | 1  | 2  | 5  | 10 | 11 | 12 | 15 | 19 | 18 | 17 | 14 | 9  |
| No.101 | 8 | 7  | 1  | 2  | 3  | 6  | 5  | 10 | 11 | 12 | 18 | 17 | 16 | 13 | 14 | 9  |
| No.102 | 8 | 12 | 15 | 18 | 17 | 16 | 13 | 10 | 11 | 7  | 4  | 1  | 2  | 3  | 6  | 9  |
| No.103 | 8 | 12 | 15 | 18 | 17 | 14 | 13 | 10 | 11 | 7  | 4  | 1  | 2  | 5  | 6  | 9  |
| No.104 | 8 | 12 | 15 | 14 | 17 | 16 | 13 | 10 | 11 | 7  | 4  | 5  | 2  | 3  | 6  | 9  |

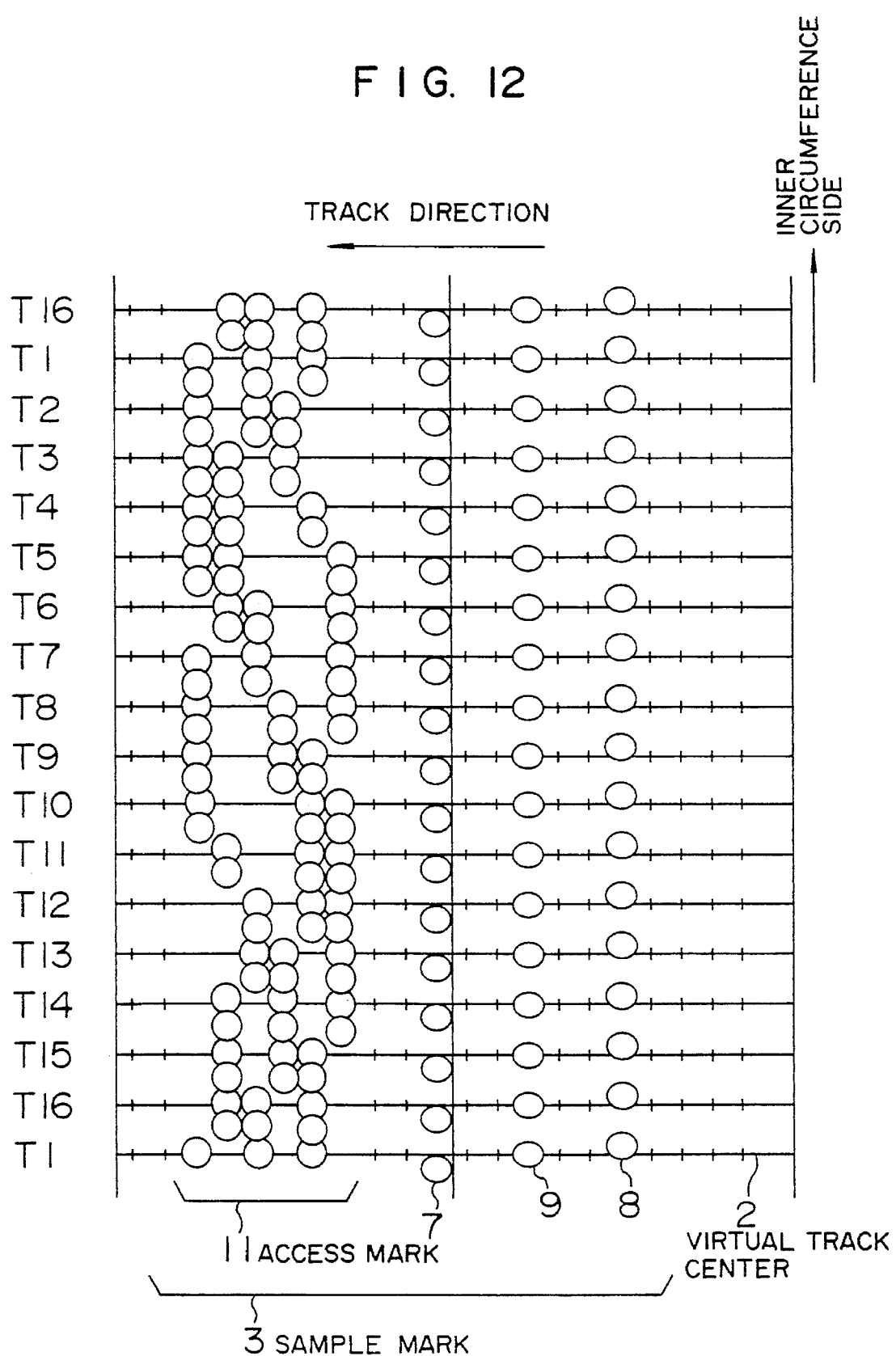

FIG. 22A

| INPUT PATTERN | OUTPUT |
|---|---|
| (pattern) | 32 |
| (pattern) | 44 |
| (pattern) | 50 |
| (pattern) | 86 |
| (pattern) | 106 |
| (pattern) | 112 |
| (pattern) | 170 |
| (pattern) | 188 |
| (pattern) | 184 |
| (pattern) | 166 |
| (pattern) | 148 |
| (pattern) | 142 |
| (pattern) | 160 |
| (pattern) | 100 |
| (pattern) | 80 |
| (pattern) | 68 |

FIG. 22B

| INPUT | OUTPUT |
|---|---|
| 32 | 0 |
| 44 | 1 |
| 50 | 2 |
| 86 | 3 |
| 106 | 4 |
| 112 | 5 |
| 170 | 6 |
| 188 | 7 |
| 184 | 8 |
| 166 | 9 |
| 148 | 10 |
| 142 | 11 |
| 160 | 12 |
| 100 | 13 |
| 80 | 14 |
| 68 | 15 |

OPTICAL INFORMATION RECORDING MEDIUM HAVING A TRANSITIONING THREE BIT ACCESS PIT GROUP AND OPTICAL INFORMATION RECORDING/REPRODUCING APPARATUS USING THE SAME

This application is a continuation application of Ser. No. 07/511,800, filed Apr. 20, 1990, now abandoned.

BACKGROUND OF THE INVENTION

The present invention relates to an optical information recording medium and an optical information recording/reproducing apparatus in which information is optically recorded, and more particularly to an optical information recording medium and an optical information recording/reproducing apparatus suitable for recording/reproduction of data based on information of pits preliminarily provided on a disk.

In recent years, a so-called optical disk system in which information is optically recorded in and reproduced from a disk-like recording medium has been developed. One format for such an optical disk system is known as the sampled format. The details of the sampled format system are discussed in the proceedings of SPIE, Vol. 695, Optical Mass Data Storage II, 1986, pp. 112–115 and pp. 239–242.

In the sampled format system, a tracking error signal and a timing signal are obtained by use of sample marks which are preliminarily provided on a disk, as shown in FIG. 1. The timing signal is multiplied to extract a clock signal and the detection of a servo system error signal such as a tracking error signal or a focusing error signal and the recording/reproduction of data is made in synchronism with the extracted clock signal. The sample marks include pairs of wobbling pits 7-1 and 8-1, 7-2 and 8-2, - - - , and 7-n and 8-n positioned at a distance of ¼ track pitch from virtual track centers 6-1, 6-2, - - - and 6-n in opposite directions and timing pits 9-1, 9-2, - - - , 9-n positioned on the track centers. For example, a tracking error signal is detected from a difference in amplitude between signals reproduced from the wobbling pits 7-1 and 8-1 and a clock signal is extracted from the timing pit 9-1. A so-called singular pattern is employed in which no modulation pattern is present between the pits 8-1 and 9-1 (or eighteen 0's are continuously present), which allows the discrimination of the sample mark. The positions of the first wobbling pits 7-1 to 7-n change for every 16 tracks in order to obtain a cross-track signal.

A data format is shown in FIG. 2. One track or one track turn is divided into 32 sectors, each sector is composed of 43 segments and each segment is divided into 18 bytes. Each byte is divided into 15 channel bits. One of the 43 segments is provided for sector indentification information (ID) and contains sector identification information which is recorded in the form of a pre-pit. Data is recorded in the 42 remaining segments. Since one segment is constructed by a sample mark of 2 bytes and a data region of 16 bytes, data of 672 bytes is recorded in one sector. The 672-bytes of data include 512-bytes of user data, 16-bytes of control data and 144-bytes of error correction code.

When recording is to be made, data is recorded in the data region between the sample marks in such a manner that 8 bits of data or one byte is converted in-to 15 channel bits (=1 symbol) in accordance with a modulation system called 4/15 modulation. The 4/15 modulation is described in the above-mentioned article of the proceedings of SPIE. In the 4/15 modulation, the 15th channel bit is always "0" and two odd-numbered channel bits and two even-numbered channel bits of the fourteen remaining channel bits are "1". A "1" may continue up to a maximum of four successive bits but the number of "0"'s which may occur between "1" and "1" is a maximum of two. (Though only one "0" may appear between "1" and "1" in a portion over adjacent bytes in the data region, no problem arises since this "0" is "0" alloted to the 15th channel bit.) A "0" may continue up to a maximum of seventeen successive bits. (For example, this corresponds to the case of data of 00, EE in a hexadecimal notation in which the 1st, 2nd, 5th and 6th channel bits of the first data and the 9th, 10th, 13th and 14th channel bits of the second data are "1" and the remaining bits are "0".)

When data is to be reproduced, the amplitude of a reproduced signal for each channel bit is detected to select the uppermost and next uppermost ones of the reproduced signal amplitudes for the odd-numbered channel bits and the even-numbered channel bits, respectively and it is judged that a pit or "1" exists at each of the bit positions having the two uppermost amplitudes. Data is determined or reproduced by referring to a conversion table for demodulation of 4/15 modulation.

A recording area of the disk has an inner diameter of 60 mm and an outer diameter of 120 mm, the track density is 1.5 μm/track, the line or track recording density is 0.95 μm/bit and the speed of rotation of the disk is usually 1800 r.p.m. though not limited to these values. The number of sample marks per one track turn is 1376 and the smpling frequency is about 41 kHz.

In this system, since a tracking servo is performed by use of only information from the sample marks, the amount of track movement when access is made is also derived from the sample marks. Since the positions of the first wobbling pits 7-1 to 7-n change for every 16 tracks, as shown in FIG. 1, the track movement amount for every 16 tracks can be detected by detecting the first wobbling bit positions.

The detection limit of the speed of movement of a pickup by pickup driving means upon access is about 1 m/s.

SUMMARY OF THE INVENTION

However, the above modulation system involves the following problems with respect to access.

First, since a track movement amount detection signal has only two kinds of patterns based on the fact that the first wobbling pits 7-1 to 7-n takes either a forward position change or a backward position change with respect to the second wobbling pits 8-1 to 8-n for every 16 tracks, it is not possible to detect the direction of a relative movement between the pickup and the disk when access is made.

Second, the resolution of the detection of track movement is 16 tracks and not be sufficient. If the cycle period of the foreward/backward position change of the first wobbling pits is made smaller than 16 tracks in order to enhance the resolution of the track movement amount detection signal, the detection limitation speed becomes insufficient.

Accordingly, an object of the present invention is to provide a recording medium in which the direction of movement thereof upon access can be discriminated and which has a format optimal to an optical disk system having a high resolution for track movement and to provide a recording/reproducing apparatus which is suitable for recording/reproduction of data in/from such a recording medium.

According one aspect of the present invention, the above object can be achieved by providing an access mark which periodically changes in accordance with the track-to-track transition in a radius direction of a disk-like recording medium. The access mark is coded in accordance with an M/N modulation system. An apparatus for recording/reproducing information in/from the recording medium handles the access mark as data. A differential detection for the sample mark is made by a difference demodulator so that an error of the read access mark settles within one track. The term "differential detection" used here in conjunction with the M/N modulation means a detection or demodulation system in which the amplitudes of the respective signals of M transmission bits corresponding to data of one byte are measured and the positions of the transmission bits having, the 1st upper (or uppermost) amplitude to the N-th upper amplitude in order of magnitude among the measured amplitudes are demodulated as pit positions.

In order that the access pits or mark can be surely reproduced without influence of noise caused by scratches on the disk or the distortion of pits, noise produced by a reproducing apparatus itself, and even in the case where a read-out light spot scans between tracks so that an output waveform having a sufficiently large amplitude is not obtainable, another aspect of the present invention provides a recording medium in which the access marks or pits are preformated on tracks and between tracks.

According to a further aspect of the present invention, there is provided a recording medium in which clock or timing pits are preformated on tracks and between tracks, like the access pits preformated on tracks and between tracks thereby eliminating the influence of noise or the like.

BRIEF DESCRIPTION OF THE DRAWINGS

FIGS. 5A to 5D show a data/pattern conversion table of a 4/11 modulation system employed in the embodiment shown in FIG. 3;

FIG. 10A illustrates a relation between each symbol and the corresponding pit arrangement in the embodiment; FIG. 10B shows examples of a repetitive train of pit patterns along a radius direction of the disk in which symbols shown in FIG. 10A are used;

FIGS. 11A, 11B and 11C are diagrams which concern the embodiment and show examples of a repetitive train of pit patterns along a radius direction of the disk in which the symbols shown in FIG. 10A are used;

FIG. 12 shows the arrangement of sample marks in a further embodiment of the present invention;

FIGS. 22A and 22B show an example of access patterns processed by the track movement amount detecting circuit and an example of the conversion of access patterns into numeric values.

DESCRIPTION OF THE PREFERRED EMBODIMENTS

Figure 1:
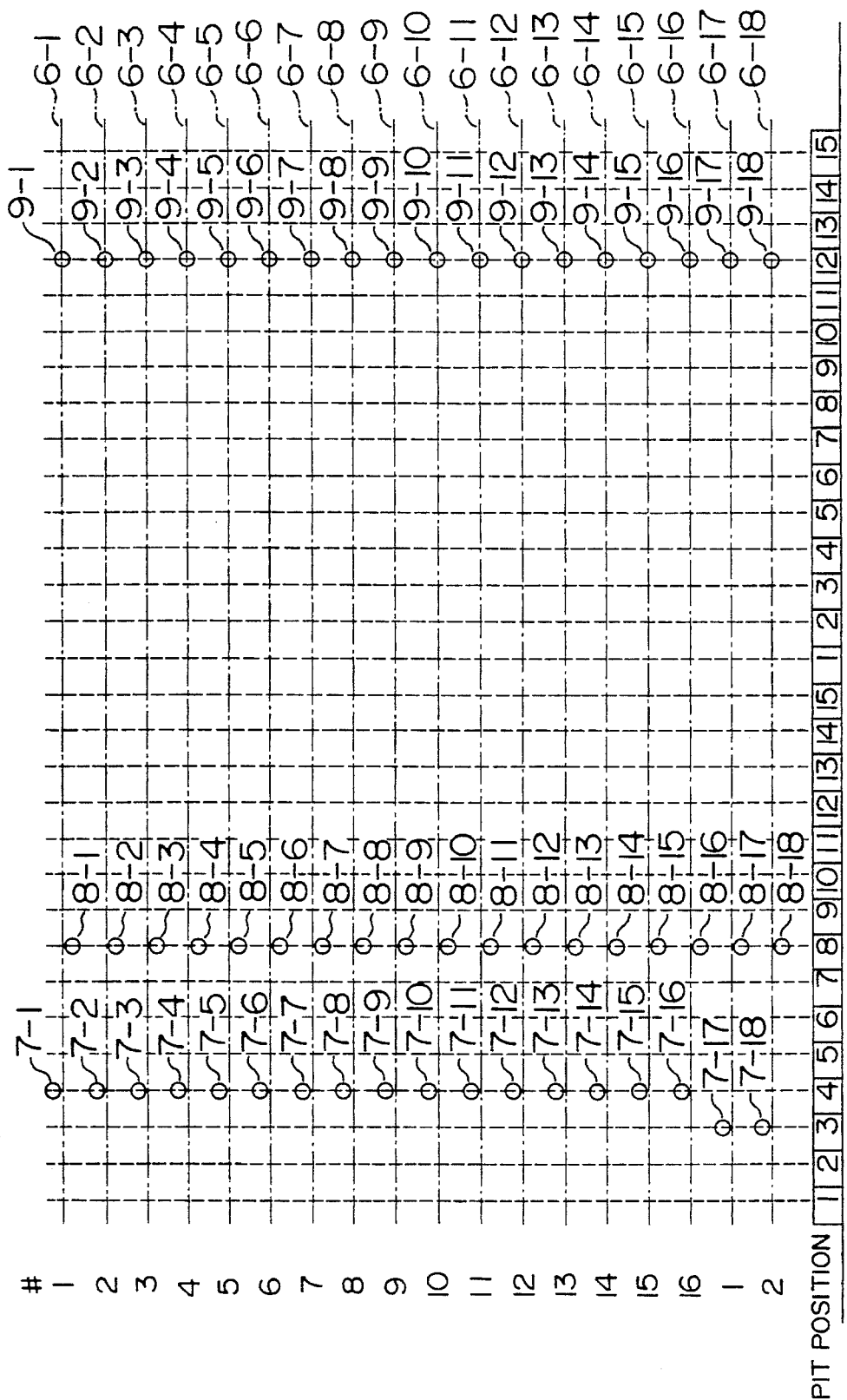
FIG. 1 shows an example of the arrangement of sample marks provided on the conventional optical information recording medium.
Figure 2:
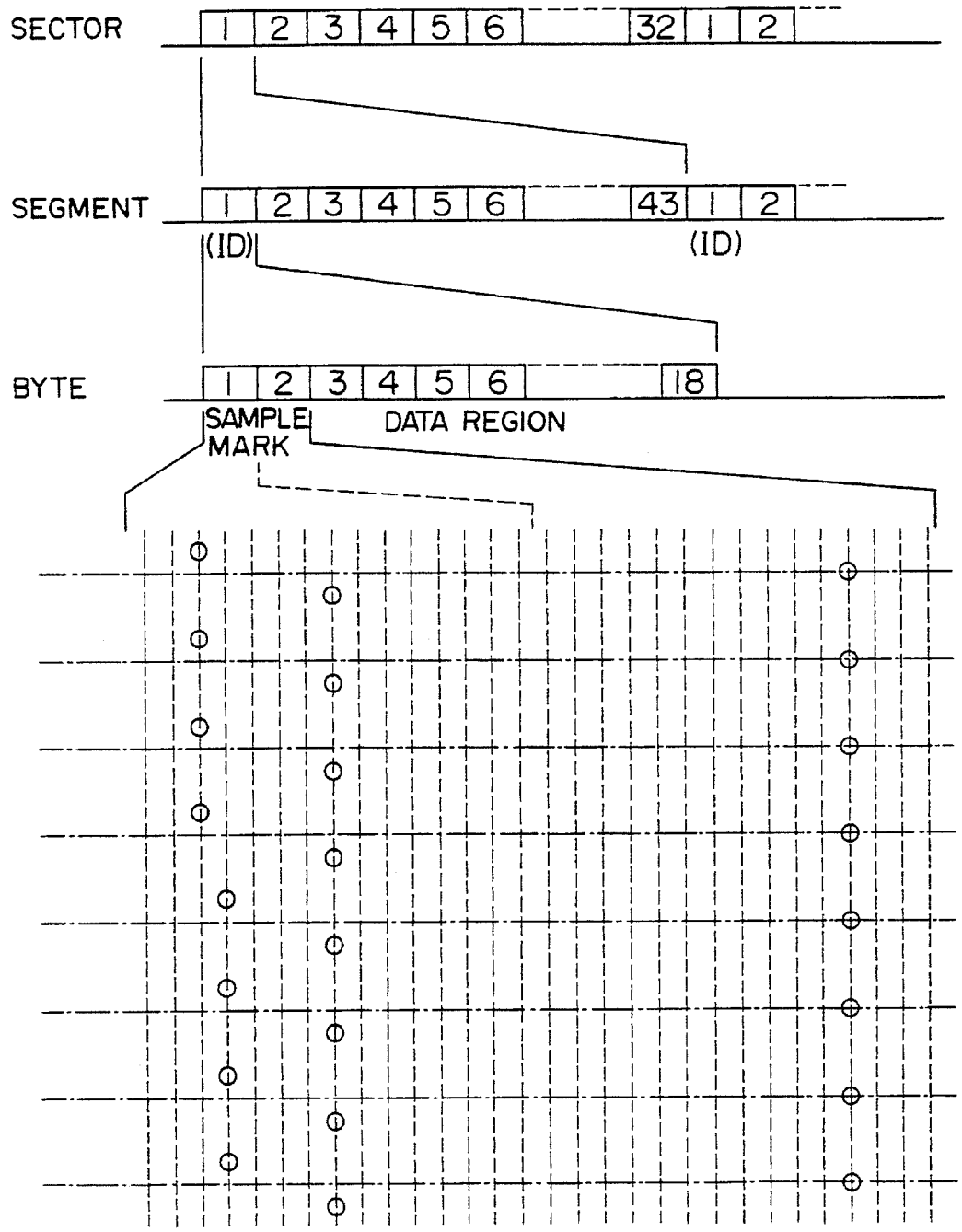
FIG. 2 shows an example of the data format of the conventional information recording medium.
Figure 3:
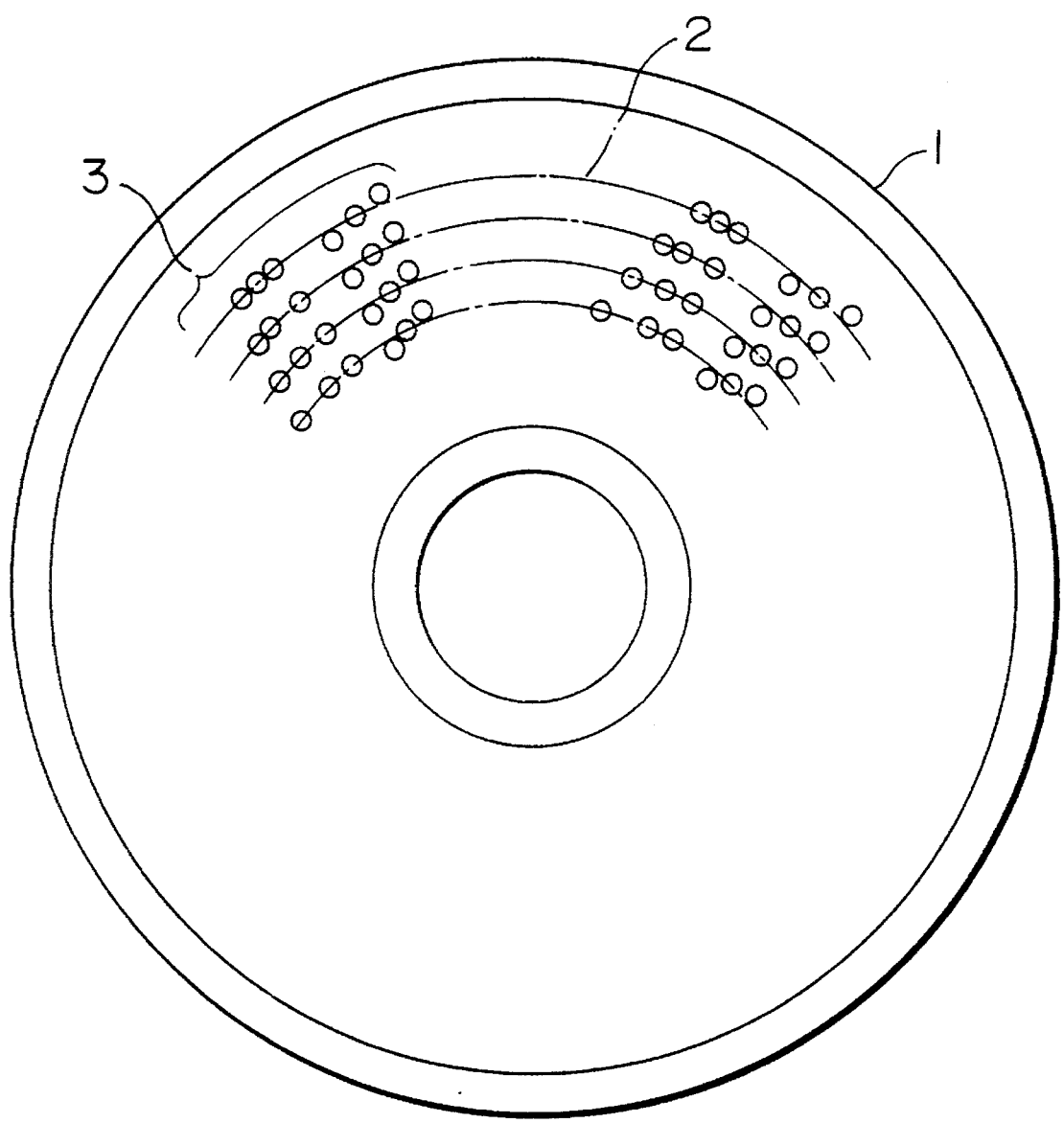
FIG. 3 is a conceptual view of a disk according to the present invention which shows the arrangement of pits on an optical information recording medium according to one embodiment of the present invention.
Figure 4:
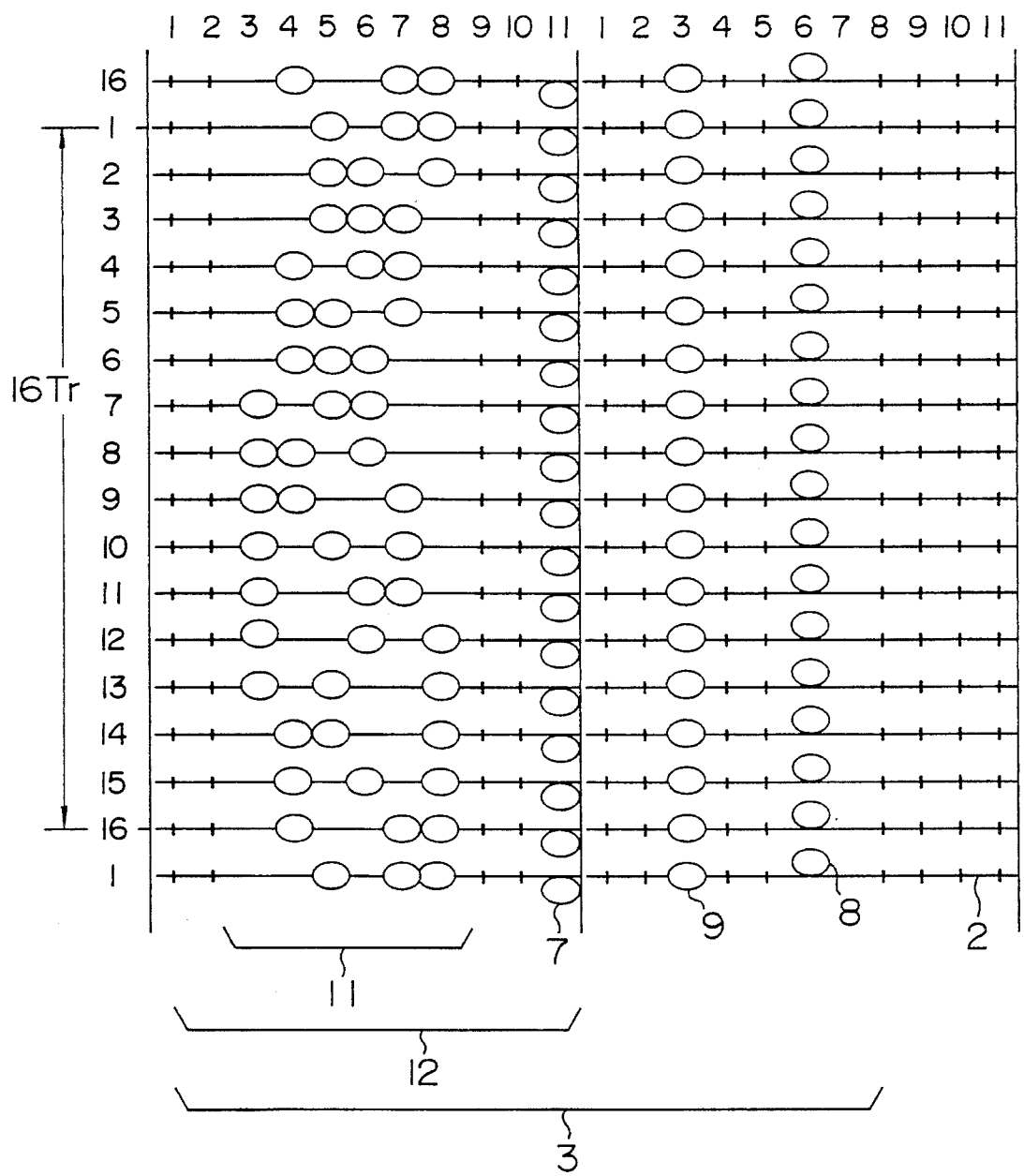
FIG. 4 is a diagram for explaining sample marks used in the embodiment shown in FIG. 3.

A first embodiment of the present invention will now be explained with reference to FIGS. 3 to 6. FIG. 3 is a conceptual plan view of a disk or optical information recording medium according to the first embodiment and FIG. 4 shows the arrangement of pits in the embodiment shown in FIG. 3. In the present embodiment, a 4/11 modulation system is used as one example of a data modulation system.

Referring to FIG. 3, reference numeral 1 designates a disk-like information recording medium. A spiral or concentrically circular tracks(s) 2 are formed on the recording medium 1 and sample marks 3 are periodically provided on the track(s) 2. As shown in FIG. 4, each sample mark 3 is composed of two pits wobbled in opposite directions with respect to a virtual track center 2 (a first wobbling pit 7 and a second wobbling pit 8), a timing pit positioned on the virtual track center 2, and access pits 11 including a plurality of pits.

The access mark 12 in the present embodiment shown in FIG. 4 is provided in accordance with a 4/11 modulation rule. The 4/11 modulation rule is a modulation rule in which in recording or reproducing information, data of one byte (8 data bits) is expanded to eleven transmission bits with a form converted into a pattern in which four ones of the eleven transmission bits are marked. FIGS. 5A to 5D show an example of a conversion table. The left column of the table represents information data and the right column thereof represents 11-bit patterns modulated. The access mark 12 is constructed such that a group of patterns in which three ones of the four marks in the modulated pattern are positioned within a range from the 3rd transmission bit to the 8th transmission bit and the one remaining mark thereof is positioned at the 11th transmission bit is selected from the conversion table and the pit of the 11th transmission bit in the selected pattern group is used as the first wobbling pit 7 in the sample mark 3. The arrangement of pits in the access mark 12 is periodically changed in accordance with the track-to-track transition in a radius direction of the disk-like recording medium. In the present embodiment, one period corresponds to 16 tracks.

Figure 6:
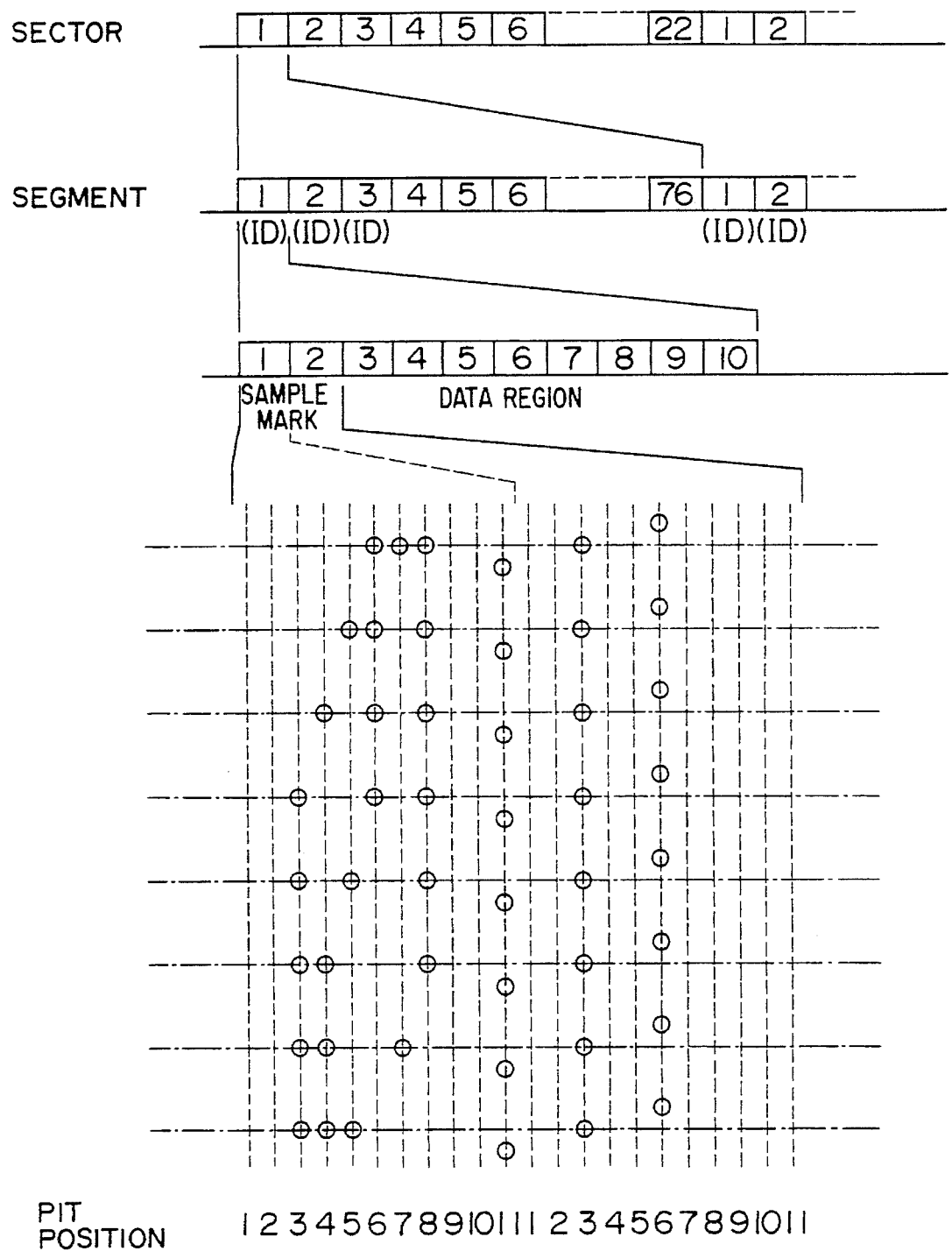
FIG. 6 shows a data format in the embodiment shown in FIG. 3.

FIG. 6 shows a data format used in the present embodiment. One track is composed of 22 sectors each of which includes 76 segments. One segment is of 10 bytes and are composed of a sample mark of 2 bytes and a data region of 8 bytes.

A user region of the disk according to the present embodiment has an inner diameter of 48 mm and an outer diameter of 80 mm. A recording area including read-in and read-out regions has an inner diameter of 46 mm and an outer diameter of 82 mm. In the case where the speed of rotation of the disk is 1800 r.p.m., the track recording density is 1.08 μm/bit (0.785 μm/channel bit), the number of sample marks per one track or one track turn is 1672 (or the sample cylce is 50.16 kHz), and the user data capacity is not smaller than 100 mega bytes.

The track recording density of the disk according to the present embodiment is lower by about 13% as compared with that of the conventional disk. Such track recording density can be easily realized by means of known technique which is the same as that employed in the case of the conventional disk and uses a laser wavelength of 830 nm and a lens opening or aperture ratio of 0.53. If it is possible to make a light spot small by the improvement of an optical system including the laser wavelength and the lens opening ratio, a more inner circumferential region can be utilized, thereby further increasing the user data capacity.

The transfer rate (the amount of data read or written per unit time) of the user data of the disk according to the present embodiment is 2.7 Mbps as compared with 3.9 Mbps of the conventional disk. However, this value of the transfer rate is caused from the decrease of the disk diameter and can be improved by increasing the speed of rotation of the disk.

The sample cycle of the disk according to the present embodiment is about 1.2 times as high as that of the conventional disk. This results from the fact that the number of sample marks per one track turn for the disk according to the present embodiment is about 1.2 times as great as that for the conventional disk. Accordingly, a phase lag due to samplers in a feedback control system including a tracking servo, a focusing servo and a PLL (phase-locked loop) for clock regeneration is improved by about 20%, thereby enhancing the stability.

The amount of track movement is detected by virtue of the access marks and the detection resolution is one track. The access mark can be decoded as data, as will be described later in conjunction with a recording/reproduing apparatus, since the access mark follows the data modulation rule. The detection limit for the track movement speed is about 1 m/s since the detection up to 16 tracks is possible in one sample cycle.

Since the recording area excepting the read-in and read-out regions spans 16 mm in the radius direction of the disk, the mean access time is 10.7 ms on the assumption that the maximum speed is controlled to be 1 m/sec. As a result, a sufficient performance can be realized.

The pits in the access marks 11 shown in FIG. 4 are arranged such that one of three pits in each access mark has a positional change between adjacent tracks. The positional change spans one transmission bit.

On the premise that the demodulation or decoding of data is made by differential detection, an error of a read access mark is sure to fall within one track even if a read-out light spot makes a scan between tracks. The differential detection associated with an N/M modulation system means a detection or demodulation system in which the respective signal amplitudes of M transmission bits corresponding to data of one byte are measured and the positions of the transmission bits having the 1st upper (or uppermost) amplitude to the N-th upper amplitude in order of magnitude among the measured amplitudes are demodulated as mark positions by use of the property of the N/M modulation that only N marks are present in the M transmission bits.

Figure 7:
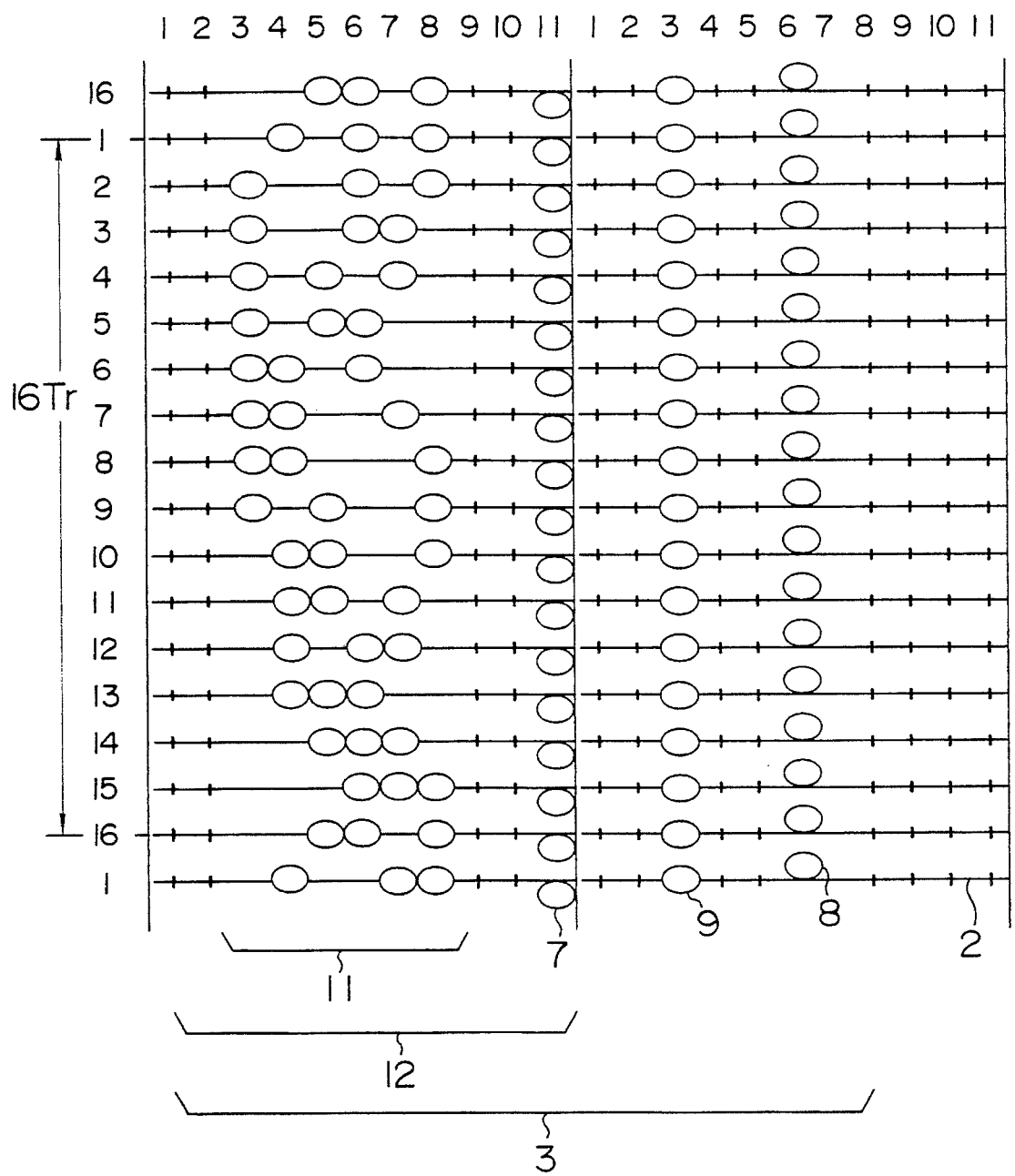
FIG. 7 is a diagram for explaining sample marks in the modification of FIG. 4 as another embodiment of the present invention.
Figure 8A:
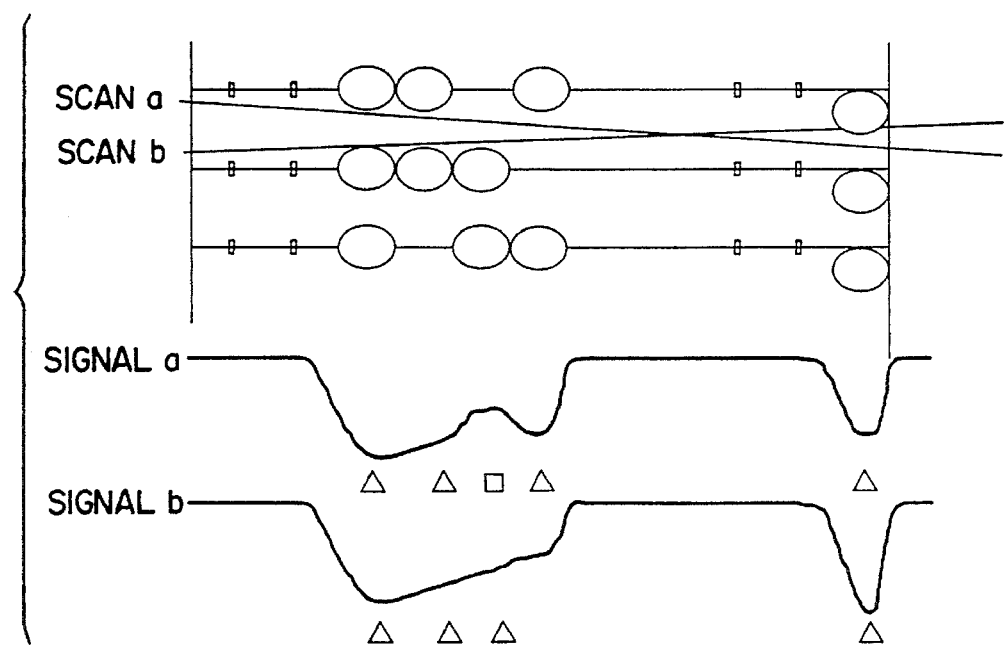
FIGS. 8A and 8B are diagrams for explaining the relations between the movement of a light spot and a reproduced signal during access.
Figure 8B:
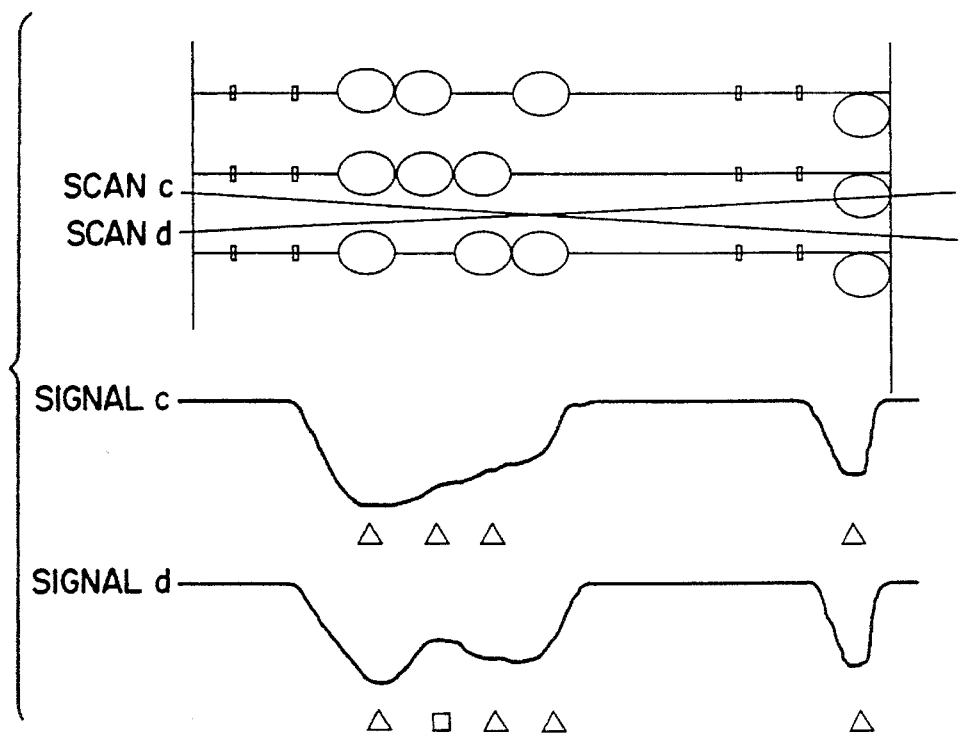

Exaplanation will now be made of the case where the scan by a read-out a light spot is made for access marks as shown in FIG. 8A in which one of three pits in each access marks has a positional change of one transmission bit between adjacent tracks and the case where the scan by a read-out light spot is made for access marks as shown in FIG. 8B in which one of three pits in each access mark has a positional change of two transmission bits between adjacent tracks with one fixed pit (for example, the 6th transmission bit) being interposed between the positions before and after the change, for example, as seen from the change from the 12th track to the 13th track in FIG. 7. Such scan is made when track search is made with the interruption of a usual tracking servo, for example, when access is made. Respective reproduced signals a, b, c and d for loci a, b, c and of read-out light spots are shown in FIGS. 8A and 8B. Triangles represent four upper amplitudes of differentially demodulated signals. Thus, the result of differential demodulation demonstrates the access mark of either one of adjacent tracks. Further, by utilizing the property of the access mark that three marks are defined in six transmission bits, an access mark can be correctly reproduced even if a signal amplitude shown by square in FIG. 8A or 8B becomes large and exceeds the signal amplitude of the 11th transmission bit due to crosstalk or the like. Namely, three upper signal amplitudes are selected in an access mark region and data shown by a square is displaced by data of the 11th transmission bit.

As has been mentioned, in the present invention, the sample cycle is improved by about 20% as compared with the conventional disk, the data density, redundancy and track movement speed are substantially the same as those in the conventional device, the detection resolution of track movement amount is one track, and a direction-detectable access mark can be realized since an access mark pattern is decoded as a numeric-value code, as will be hereinafter described in detail in conjunction with a recording/reproducing apparatus for recording/reproducing data in/from the disk. Further, a reliability for read-out can be improved. For example, a track read-out error in the case where a read-out light spot makes a scan between tracks.

Figure 9:
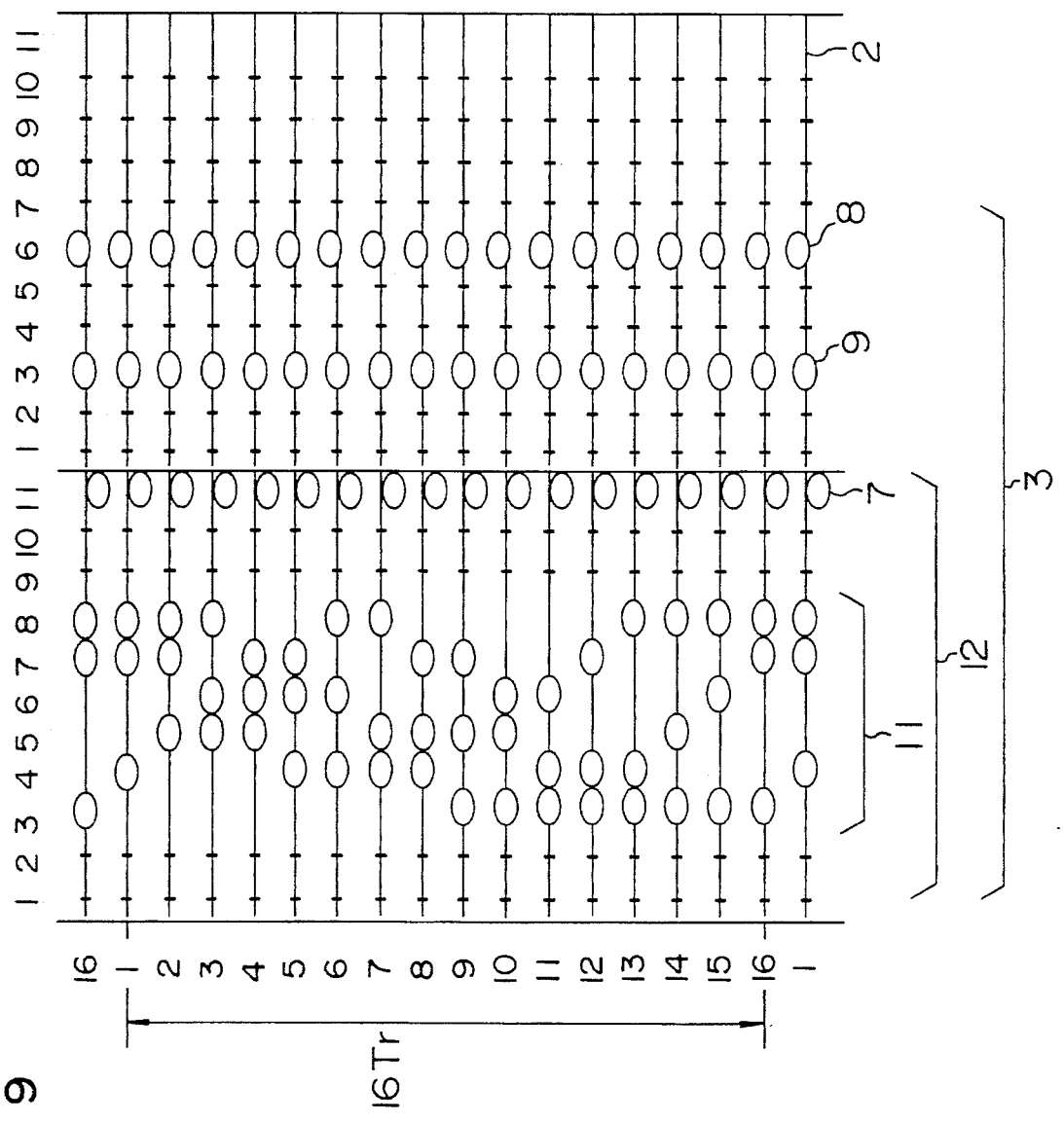
FIG. 9 shows the arrangement of sample marks in still another embodiment of the present invention.
Figures 10A, 10B:
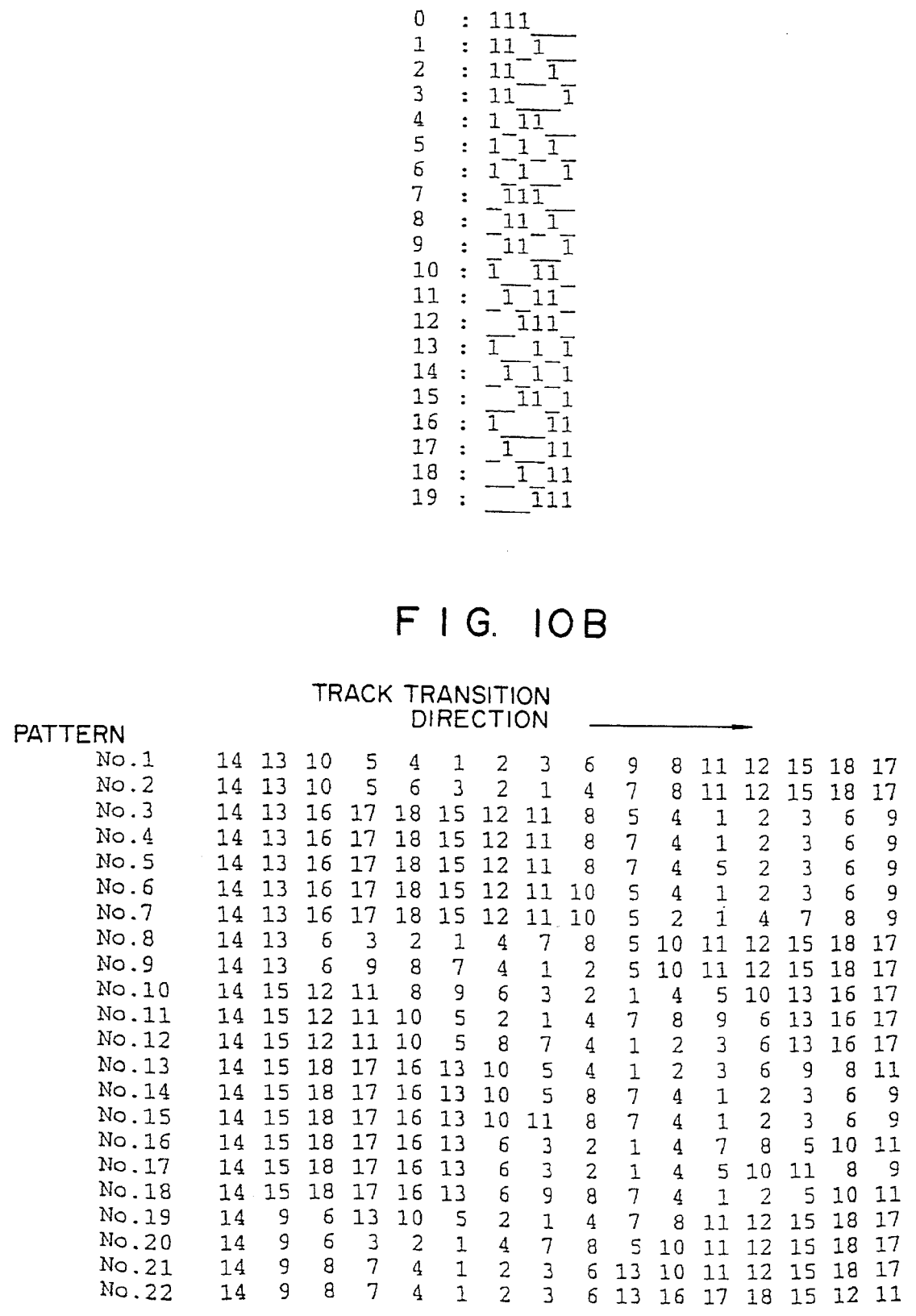

A second embodiment of the present invention is shown in FIGS. 9, 10A and 10B. FIG. 9 illustrates the configuration of servo marks over 16 tracks. Pits in access marks 11 in the present embodiment are arranged such that one of three pits in each access mark has a positional change between adjacent tracks. The positional change spans one transmission bit. FIGS. 10A and 10B show, in a symbolic representation, examples of a pit pattern to be inserted into the 3rd to 8th transmission bits of the access mark shown in FIG. 9. Twenty kinds of pit patterns in the right column of the FIG. 10A include all the combinations in which three pits are arranged in six transmission bits (including the 3rd to 8th transmission bits). The access marks are constructed by arranging sixteen ones of the twenty kinds of pit patterns in accordance with the above-mentioned regulation of positional change. Twenty kinds of numeric values in the left column of FIG. 10A are symbols representative of those pit patterns. FIG. 10B shows examples of pit patterns which are repeated as a whole for every 16 tracks and are provided in accordance with the regulation that one of three pits in each access mark has a positional change of one transmission bit between adjacent tracks. Sixteen kinds of numeric values appearing in each row of FIG. 10B symbolically represent a repetitive train of patterns which are repeated as a whole for every 16 tracks. Twenty two kinds of access marks exemplified in FIG. 10B. A train of patterns obtained by rearranging the pit patterns in each row or pattern train shown in FIG. 10B in a reverse direction may have the same property as mentioned above.

A third embodiment of the present invention is shown in FIGS. 7, 11A, 11B and 11C. FIG. 7 illustrates the configuration of servo marks over 16 tracks. Pits in access marks 11 in the present embodiment are arranged such that one of three pits in each access mark has a positional change between adjacent tracks. The positional change includes three cases as follows: ① the one pit has a positional change of one transmission bit (for example, as seen from the change from the 11th track to the 12th track in FIG. 7); ② the one pit has a positional change of two transmission bits with one fixed pit (for example, the sixth transmission bit) being interposed between the positions before and after the change (for example, as seen from the change from the 12th track to the 13th track in FIG. 7); and ③ the one pit has a positional change of three transmission bits with two fixed pits (for example, the 5th and 6th transmission bits) being interposed between the positions before and after the change (for example, as seen from the change from the 13th track to the 14th track in FIG. 7). Like FIG. 10B, FIGS. 11A to 11C show, examples of the construction of a repetitive train of access pit patterns which are repeated as a whole for every 16 tracks. Symbols shown in FIGS. 11A to 11C follow the representation shown in FIG. 10A. The examples shown in FIGS. 11A to 11C are 104 kinds of pattern trains, among possible pattern trains provided in accordance with the above-mentioned regurations ① to ③, in which respective versions of the 1st to 8th tracks obtained through the axially symmetric interchange of the 3rd to 8th transmission bits with respect to the axis of symmetry taken between the 5th and 6th transmission bits form the 9th to 16th tracks. A train of patterns obtained by rearranging the patterns in each pattern train shown in FIGS. 11A to 11C in a reverse direction may have the same property as mentioned above.

Next, explanation will be made of a fourth embodiment as the modification of the present invention in which access marks are provided on tracks and between tracks. The access marks in the fourth embodiment shown in FIG. 12 include pits provided between tracks in addition to pits provided on tracks and the access mark pits provided between two adjacent tracks has the same pit pattern as the access mark provided on one of the two adjacent tracks which is on the inner circumference side. Alternatively, the access mark pits provided between two adjacent tracks may have the same pit pattern as the access mark provided on the track on the outer circumference side. Regarding the pits on the tracks, one of three pits in each access mark has a positional change between adjacent tracks.

Figure 13A:
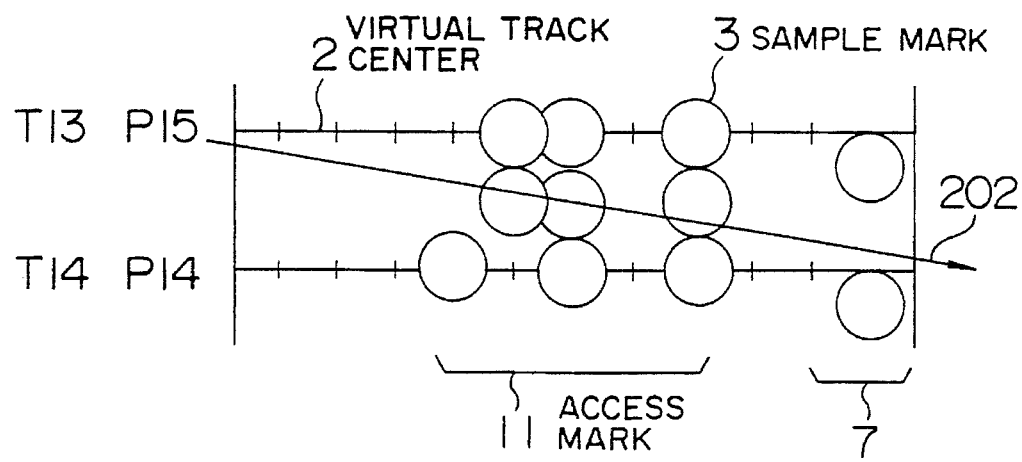
FIGS. 13A, 13B and 13C are diagrams showing the relation between a read-out light spot, a reproduced waveform and a decoded pattern when the sample mark arrangement shown in FIG. 12 is used.
Figure 13B:
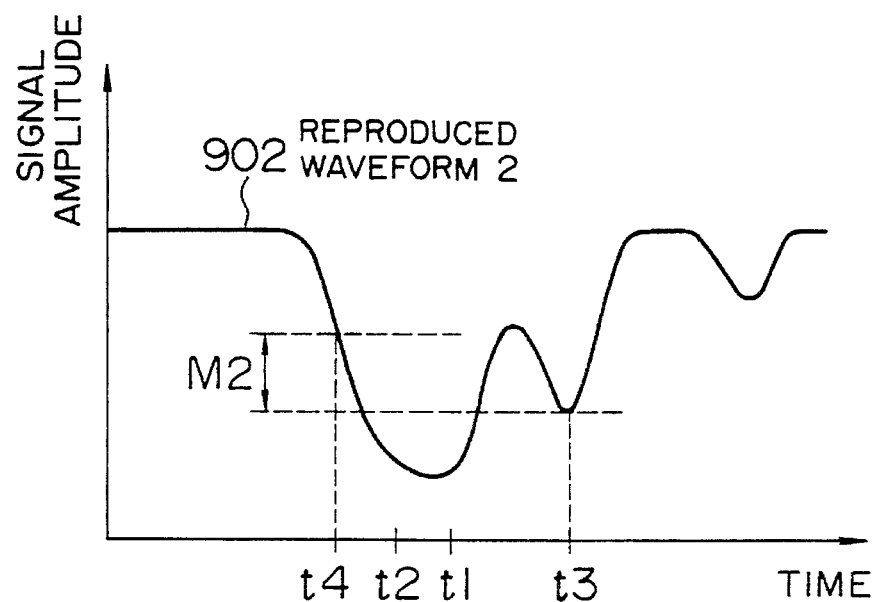

FIG. 13A shows an example of the case where a read-out light spot scans from the 13th track to the 14th track in FIG. 12. The 13th track (T13) includes a pattern P15 corresponding to a pattern represented by symbol 15 in FIG. 10A and the 14th track (T14) includes a pattern P15 corresponding to a pattern represented by symbol 14 in FIG. 10A. Arrow 202 shows the locus of the center of the read-out light spot. FIG. 13B shows a reproduced waveform 2 (902) obtained when the read-out light spot takes the locus shown in FIG. 13A. Four ones of the 3rd to 8th transmission bits in an access mark pit region which have larger signal amplitudes in the reproduced waveform 2 (902) are represented by $t_1$ to $t_4$ on the time base of FIG. 13B. The signal amplitude is larger in the order of $t_1$, $t_2$, $t_3$ and $t_4$. Since the decoding of an access mark by a differential detection selects the positions of $t_1$, $t_2$ and $t_3$ as pit positions, the pattern P15 can be decoded. In this case, the passing position of the light spot could be detected with no error (since the decoding of either P15 or P14 suffices).

Figure 13C:
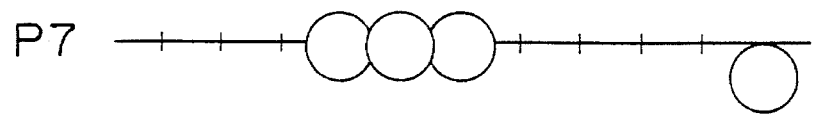

However, the reproduced waveform 2 (902) actually obtained is affected by noise caused by scraches on the disk or the distortion of pits, noise produced by a reproducing apparatus itself, and so on. If the signal amplitude of $t_4$ of FIG. 13B becomes larger than the signal amplitude of $t_3$ due to such noise, such a pattern P7 as shown in FIG. 13C corresponding to a pattern represented by symbol 7 in FIG. 10A is decoded. This pattern is not present in the access mark patterns shown in FIG. 12 and hence it is a mismodulation pattern. The probability of occurrence of such an erroneous detection can be represented by an amplitude margin M2 of the reproduced waveform 2 (902). Namely, the detection error is hard to detect as a difference between the signal amplitudes of $t_3$ and $t_4$ becomes large. Since the access patterns in the present embodiment are provided on tracks and between tracks, there is provided an effect that even if a read-out light spot makes a scan between tracks, the amplitude of the reproduced waveform 2 (902) is not deteriorated so that a sufficient amplitude margin M2 can be ensured, thereby making the erroneous detection of an access mark hard to be produced.

Figure 14:
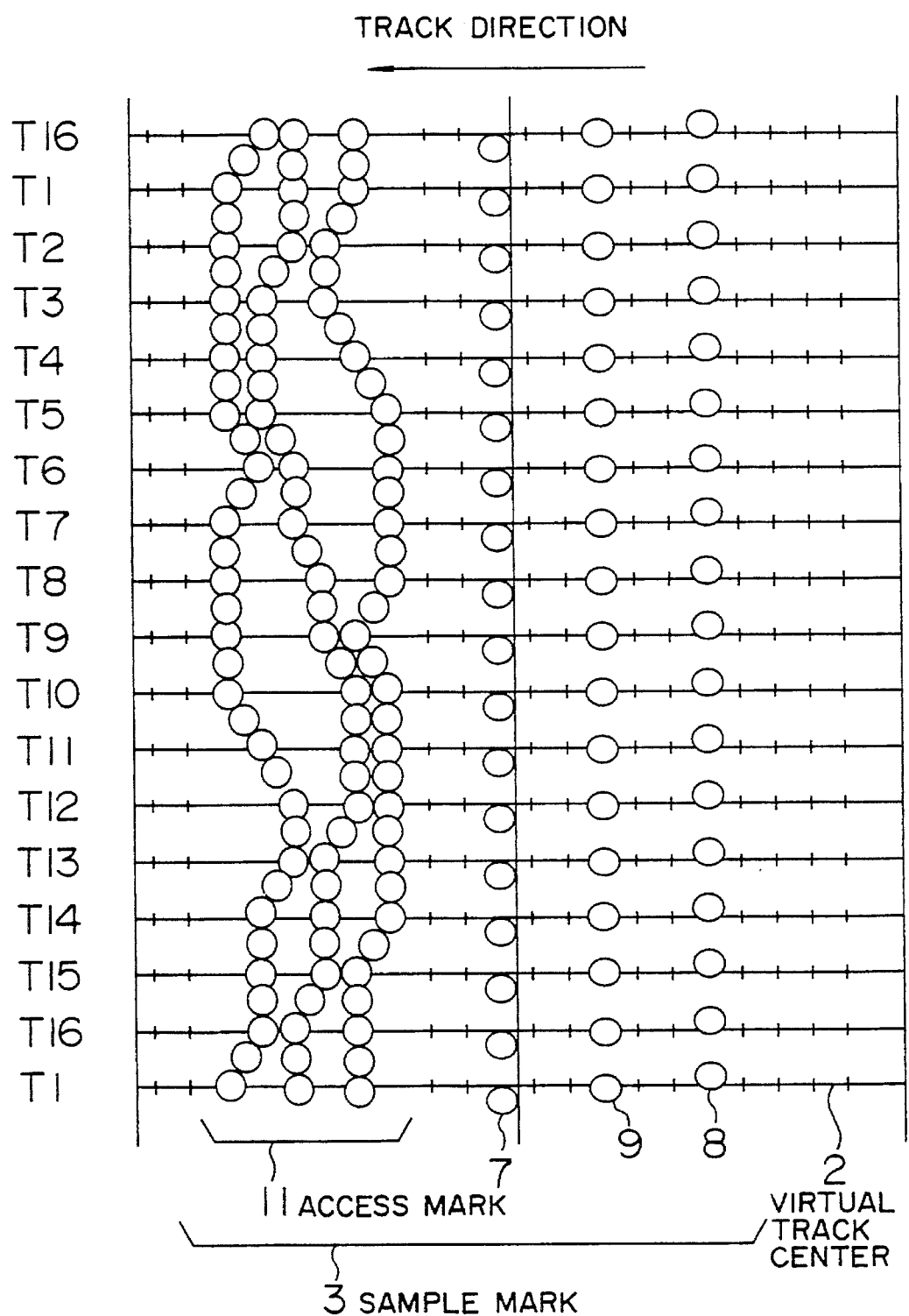
FIG. 14 shows the arrangement of sample marks in a still further embodiment of the present invention.
Figure 15:
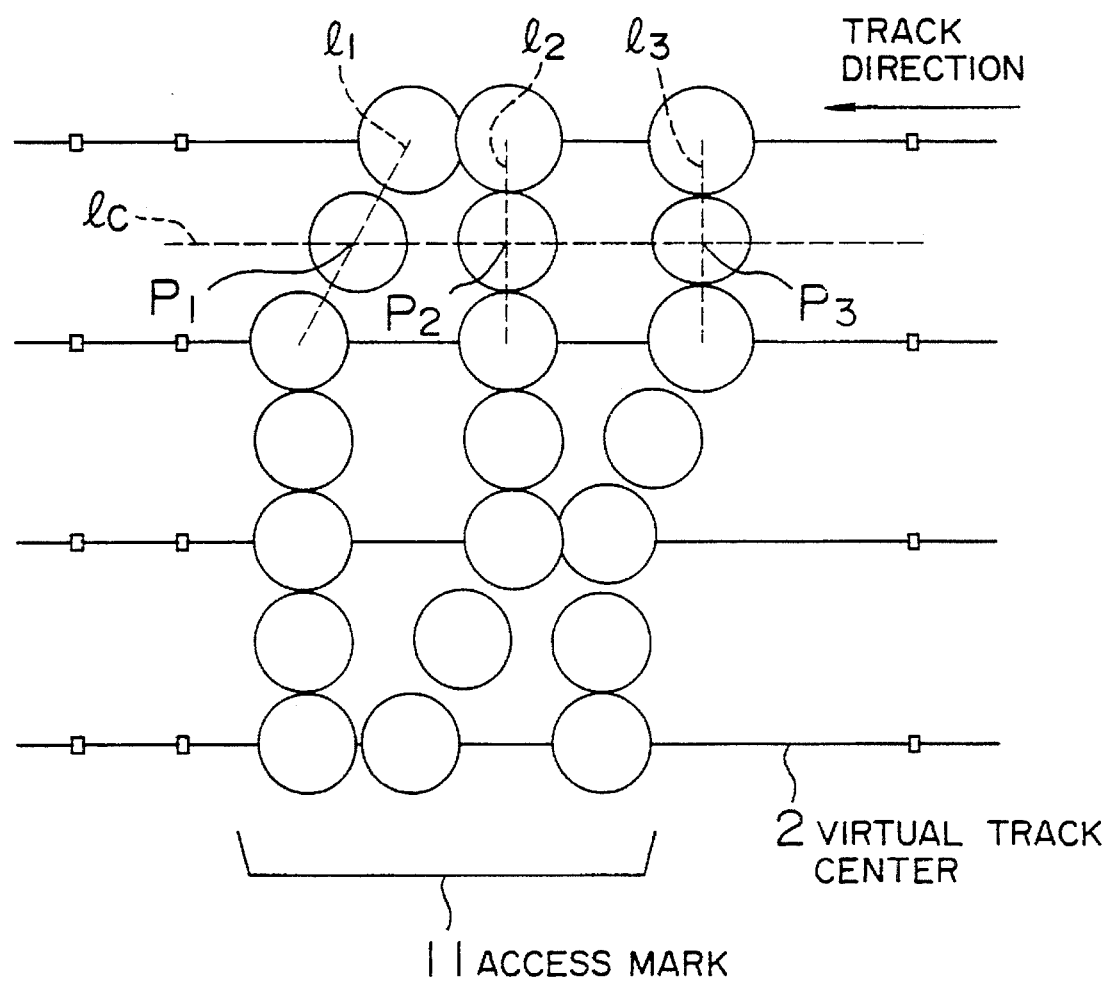
FIG. 15 is a diagram for explaining in detail the arrangement of sample marks in the embodiment shown in FIG. 14.

A fifth embodiment of the present invention is shown in FIG. 14. Access marks shown in FIG. 14 include pits provided on tracks and pits provided between tracks. Regarding the pits on the tracks, one of three pits in each access mark has a positional change between adjacent tracks. The positions of the pits provided between tracks are determined through the following steps (see FIG. 15). (1) Auxiliary lines $l_1$ to $l_3$ connecting the centers of pits on one of two adjacent tracks and the centers of pits on the other track thereof are drawn so that the three auxiliary lines do not intersect each other. (2) An auxiliary line $l_c$ representing the center between the two adjacent tracks in a tangential direction is drawn. (3) The intersections of the lines $l_1$, $l_2$ and $l_3$ and the line $l_c$ are defined as $P_1$, $P_2$ and $P_3$, respectively. (4) Pits are provided at $P_1$, $P_2$ and $P_3$. The present embodiment provides an effect substantially equivalent to that of the fourth embodiment since pits between two adjacent tracks function so as to enhance the corresponding detection outputs of pits on either one of the two adjacent tracks, thereby providing a detection waveform similar to that of the pits on the either one track.

Figure 16:
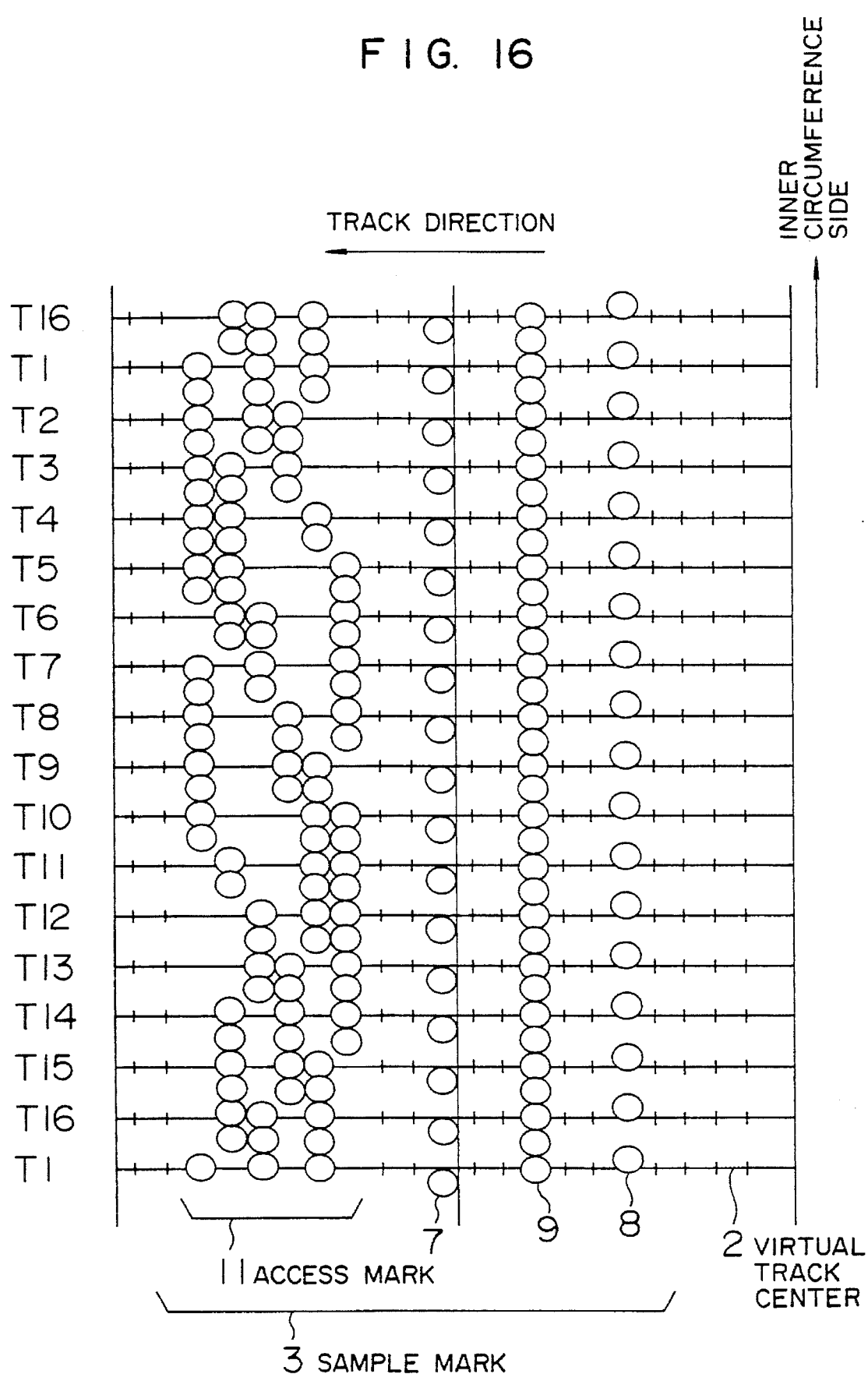
FIG. 16 shows the arrangement of sample marks in a furthermore embodiment of the present invention.

A sixth embodiment of the present invention is shown in FIG. 16. Access marks in the present embodiment are the same as those in the fourth embodiment shown in FIG. 12.

In the present embodiment, timing pits 9 are provided on tracks and between tracks. The present embodiment provides an effect that a clock signal can be stably regenerated since the amplitude of a reproduced waveform of the timing pit 9 is not deteriorated even if a read-out light spot passes between tracks.

Figure 17:
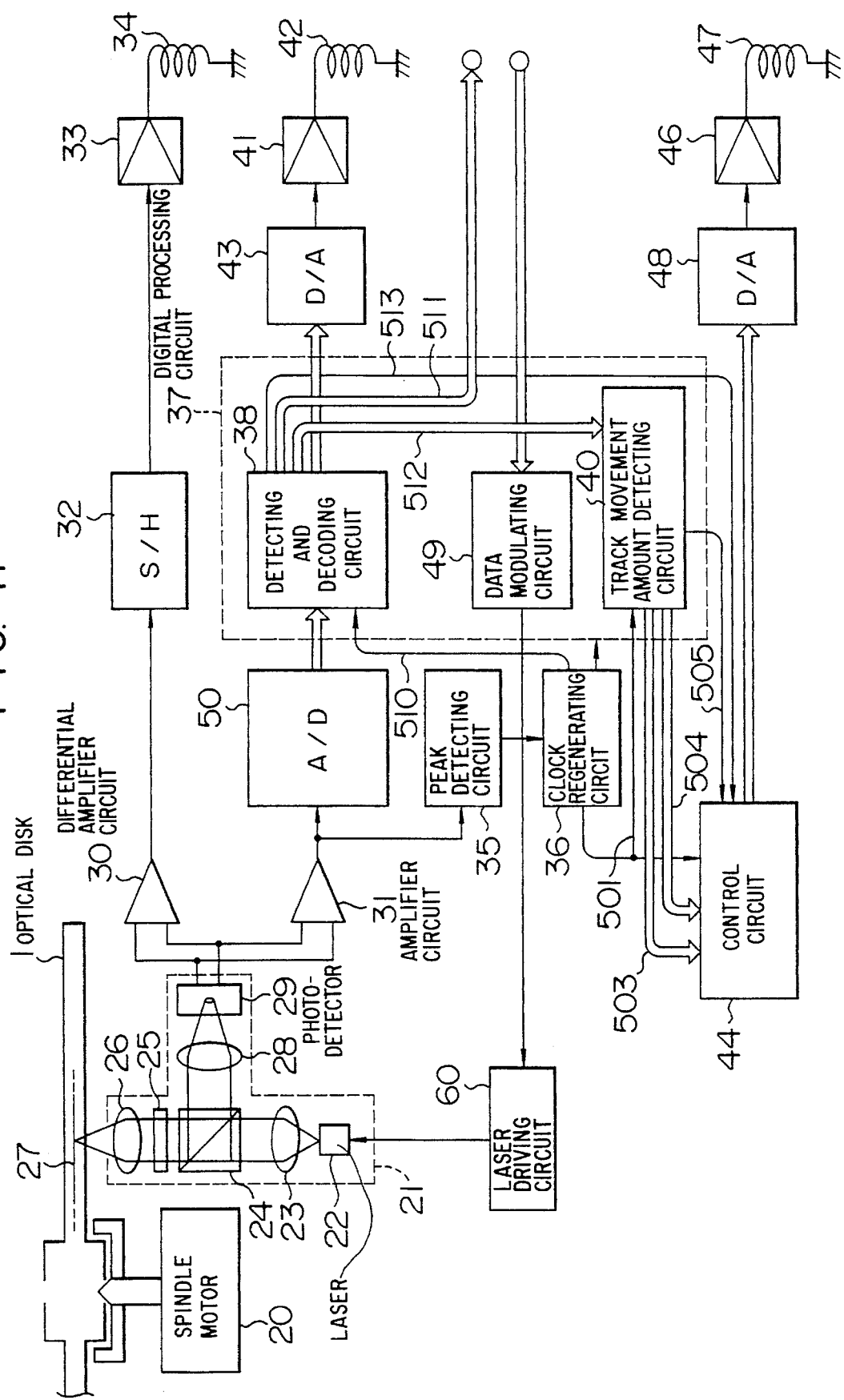
FIG. 17 is a block diagram of a recording/reproducing apparatus for recording/reproducing information in/from an optical information recording medium according to the present invention.

FIG. 17 shows a block diagram of a recording/reproducing apparatus for recording/reproducing data in/from the optical disks which have been shown as the first to sixth embodiments in the foregoing.

In FIG. 17, reference numeral 1 designates an optical disk. Sample marks 3 each including an access mark, wobbling pits and a timing pit are preliminarily provided on one surface of the disk 1, as shown in the first to sixth embodiments. Numeral 20 designates a spindle motor for rotating the optical disk 1. Numeral 21 designates an optical pickup for converging a laser beam from a laser semiconductor 22 onto a recording surface 27 of the disk 1 through a collimator lens 23, a polarizing beam splitter 24, a quarter-wave plate 25 and an objective lens 26. Light reflected from the recording surface 27 of the disk 1 passes through the objective lens 26 and the quarter-wave plate 25 and is reflected by the polarizing beam splitter 24. The light reflected by the polarizing beam splitter 24 is converged onto a photodetector 29 by a detecting lens 28. The photodetector 29 is divided into two segments so that a focusing error signal can be detected from a difference between outputs of the two detector segments.

Reference numeral 30 designates a differential amplifier circuit for amplifying a signal representative of a difference between the detection outputs of the segments of the photodetector 29 (or a focusing error signal). Numeral 32 designates a sample/hold circuit for detecting and holding the focusing error signal (focus error signal detected in area in which pits are not existed following the second wobbling pit 8 in FIGS. 4, 7 and 9). Numeral 33 designates a servo circuit for performing a focusing servo. The servo circuit 33 performs the focusing servo by activating an actuator 34 which drives the objective lens 26 in a focus direction.

Reference numeral 31 designates an amplifier circuit for detecting the total amount of light incident upon the photodetector 29. Numeral 35 designates a peak detecting circuit which is constructed by a differentiating circuit and a zero-cross detecting circuit and detects a peak position from a reproduced signal by detected by the amplifier circuit 31 which corresponds to the timing pit 9. The positions of the first wobbling pit 7, the second wobbling bit 8 and the timing pit 9 in a reproduced signal of the servo mark do not change over the surface of the disk and always appear as a constant pattern even if a tracking servo is not made. A group of those pits can be specified since the pit group appears at a constant cycle. A clock regenerating circuit 36 produces or regenerates a timing signal from a peak signal corresponding to the timing pit 9 and multiplies the timing signal by 110 by virtue of a PLL (phase-locked loop) circuit to extract clocks which are used for recording/reproduction of data. The cycle of the sample marks 3 is 50.1 kHz (when the speed of rotation of the disk is 1800 r.p.m.) and the clock frequency is 5.5 MHz. An output of the clock regenerating circuit 36 is used as clocks for a digital processing circuit 37.

Reference numeral 38 designates a detecting and decoding circuit for decoding data in the respective symbols and detecting from the sample mark position the positions of transmission bits having four upper ones in order of magnitude among the amplitudes of the respective reproduced signals of transmission bits to detect an access mark conformable to the above-mentioned modulation rule. The detecting and decoding circuit 38 may also detect an error in the access mark and make a protection against the effects of the error. The details of the digital processing circuit 37 will be described in later.

Reference numeral 43 designates a D/A converter and numeral 41 designates a tracking servo circuit. A tracking error signal is outputted through the D/A converter 43 and drives an actuator 42 in a tracking direction to make a small movement of the objective lens 26 in a tangential direction of the disk to perform a tracking operation.

Reference numeral 40 designates a track movement amount detecting circuit for detecting the amount, speed and direction of track movement from the decoded values of access marks outputted from the detecting and decoding circuit 38. Numeral 44 designates a control circuit which utilizes a microcomputer and provides an overall control of focusing servo, tracking servo or spindle motor servo etc. as well as a control for track access. The control circuit 44 calculates a current position from the track movement amount outputted from the track movement amount detecting circuit 40 and outputs a linear motor control voltage through a D/A converter 48. Numeral 46 designates a servo circuit for a linear motor 47 for track access. The servo circuit 46 drives the linear motor 47 in accordance with the linear motor control voltage to move the optical pickup 21 as a whole in the track direction.

Reference numeral 60 designates a circuit for driving the semiconductor laser 22. Numeral 49 designates a data modulating circuit in which recording data inputted thereto is subjected to 4/11 modulation for conversion into serial data. The serial data is converted by the driving circuit 60 into a laser beam power change so that a thermal change is developed on the recording surface of the disk 1 to form or record pits or data therein.

The details of the detecting and decoding circuit 38 will be explained by virtue of FIGS. 18 and 19.

Figure 18:
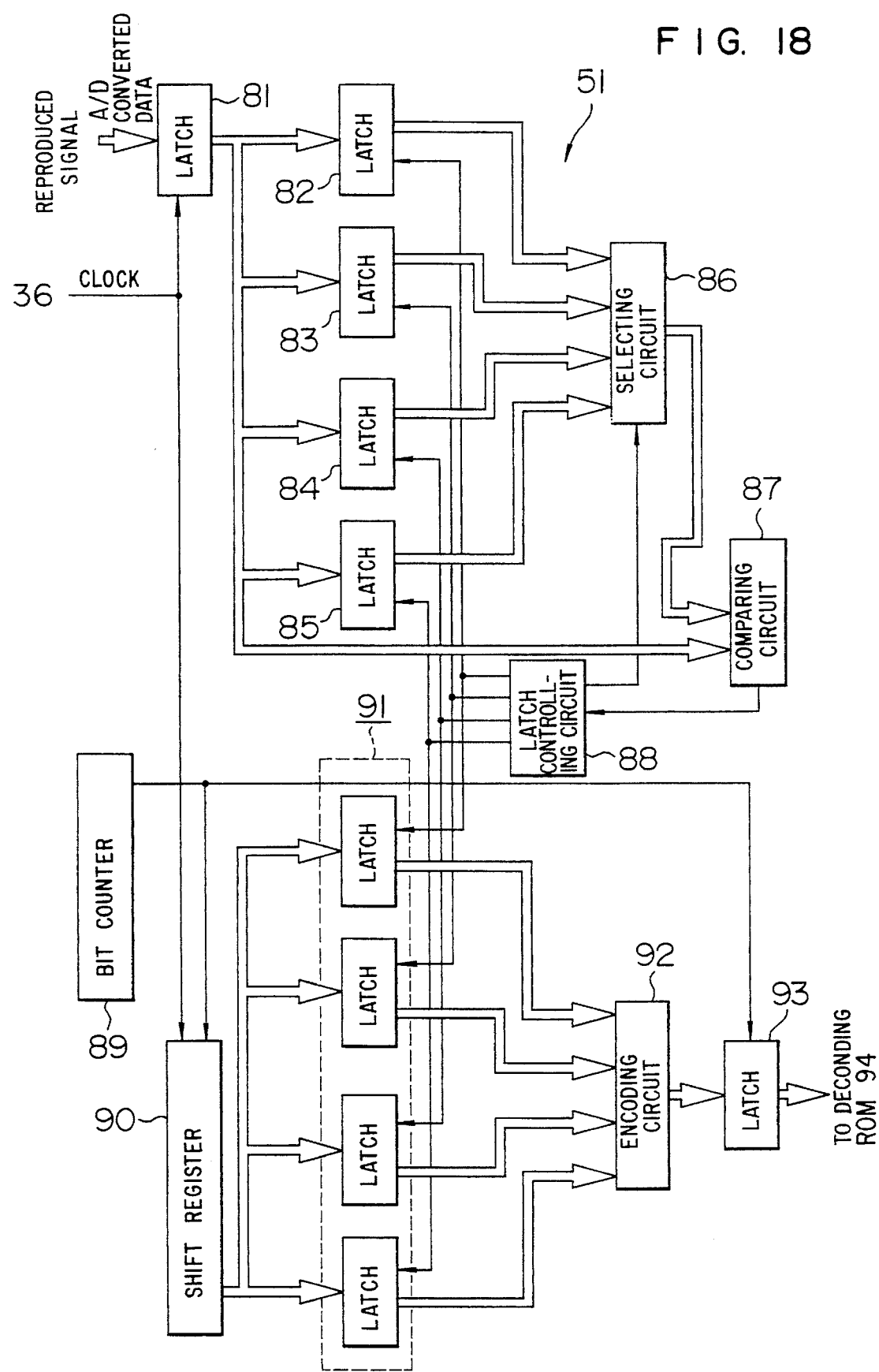
FIG. 18 is a detailed block diagram of one example of a differential circuit in a detecting and decoding circuit used in the apparatus shown in FIG. 17.
Figure 19:
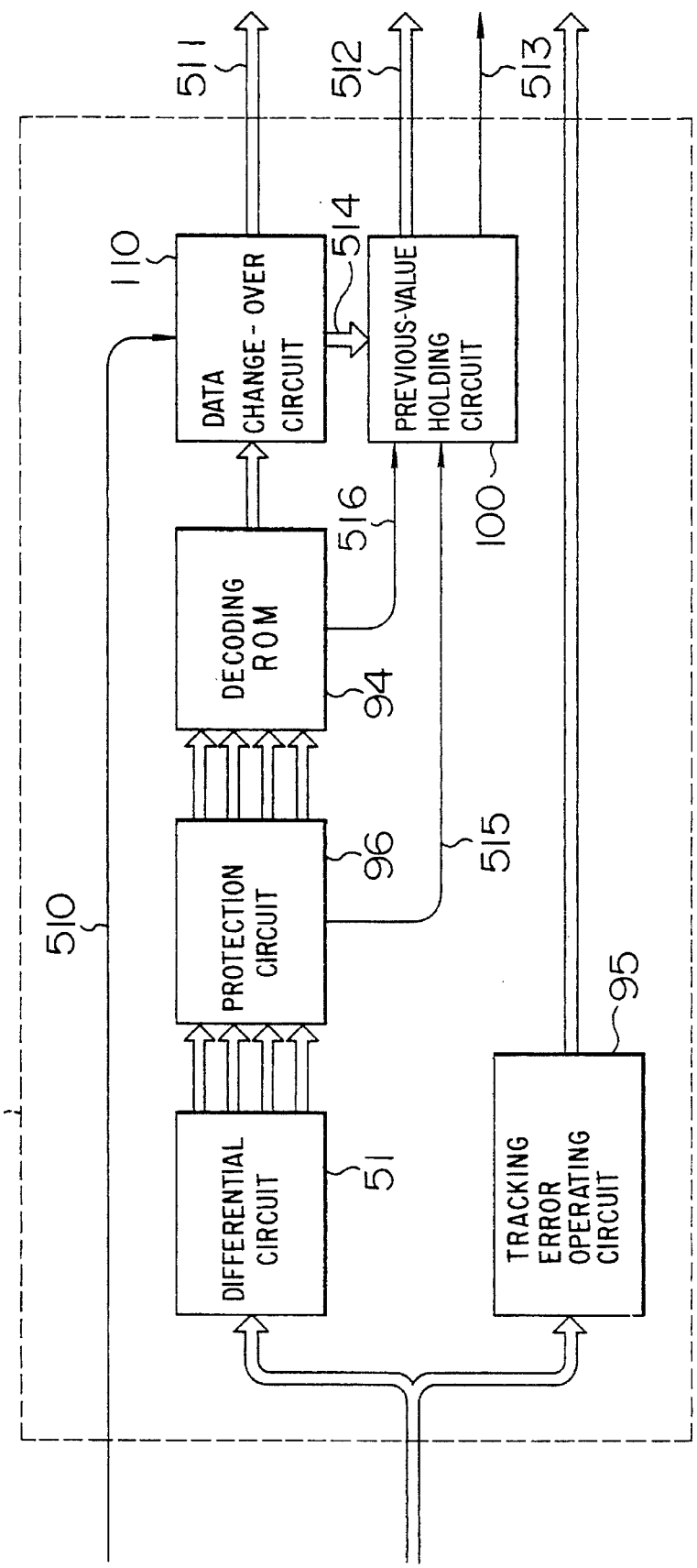
FIG. 19 is a detailed block diagram of the detecting and decoding circuit used in the apparatus shown in FIG. 17.

In FIG. 19, the detecting and decoding circuit 38 receives the reproduced signal which is detected by the amplifier circuit 31 and is converted by an A/D converter 50 to take the amplitudes of transmission pits as digital data (see FIG. 17). The reproduced signal converted into the digital data is inputted to a differential circuit 51. FIG. 18 shows the construction of the differential circuit 51.

In FIG. 18, reference nuemral 81 designates a latch circuit for the A/D converted data for every channel bit (for every 11 bits in the present embodiment since the 4/11 modulation is employed). Numerals 82 to 85 identify latch circuits for latching data of mark positions in 11 transmission bits, numeral 86 a selecting circuit for comparatively selecting minimum data among four kinds of latch data from the latch circuits 82 to 85, numeral 87 a comparing circuit for comparing an output of the selecting circuit 86 and an output of the latch circuit 81, numeral 88 a latch controlling circuit for providing control such that when the result of comparison by the comparing circuit 87 shows that the data latched by the latch circuit 81 is larger than the minimum data of the latch data from the latch circuits 82 to 85, the data of the latch circuit 81 is latched again into one of the latch circuits 82 to 85 which is holding the minimum data, numeral 89 a counter for making its counting operation by transmission clocks of 11 transmission bits to output a synchronizing signal for every data of one byte, and numeral 90 a shift register for shifting "1" set up at the start or 1st bit of a symbol (11 channel bits) for every transmission bit by the synchronizing signal from the counter 89. The shift register 90 indicates what consecutive number is a bit of the A/D converted data being inputted.

Reference numeral 91 designates a group of latch circuits for latching output data of the shift register 90 by four latch control signals outputted from the latch controlling circuit 88. Each latch circuit in the latch circuit group 91 is an 11-bit latch and indicates the transmission bit position of large-amplitude data each time the large-amplitude data is latched as the result of comparison of the A/D converted input data by the comparing circuit 87. Numeral 92 designates an encoding circuit for encoding latch data of the latch circuits in the latch circuit group 91 by virtue of an OR circuit to obtain data of mark positions in 11 transmission bits. The encoding circuit 92 has information of four mark positions at the point of time when the comparison for the A/D converted value of the 11th transmission bit being the end of the symbol has been finished. Numeral 93 designates a latch circuit for latching the mark position data for every one byte.

With the above circuit construction, each A/D converted transmission bit signal is latched in the latch circuit 81, the latched data is continually compared with the minimum data among the latch data of the latch circuits 82 to 85, and the contents of the latch circuits 82 to 85 are updated or altered by the latch controlling circuit 88 for every transmission clock so that data of bit signals having four upper amplitudes among the amplitudes of 11 signals in one symbol are ultimately held in the latch circuits 82 to 85. At the same time, the synchronizing signal from the counter 89 having a period of one symbol is shifted for every transmission clock so that mark position data are recorded in the latch circuit group 91 by the latch controlling circuit 88, and mark position data are acquired through the encoding circuit 92 and the latch circuit 93 at a period of one symbol.

Returning to FIG. 19, the output of the differential circuit 51 or the output of the latch circuit 93, that is, data of the positions of those bits in channel bits of one symbol which have four upper signal amplitudes (mark position data) is inputted to a protection circuit 96. The data inputted to the protection circuit 96 are outputted to a decoding ROM 94 as they are. The protection circuit 96 outputs data of a "1" value indicative of an access mark error (or a first protection detection signal 515) to a previous-value holding circuit 100 in either the case ① where none of the four inputted mark position data indicate the position of the 11th transmission bit or the case ② where either one of the four inputted mark position data indicates the position of either one of the 1st, 2nd, 9th and 10th transmission bits. The decoding ROM 94 decodes data on the basis of the four mark position data and in accordance with the conversion table shown in FIGS. 5A to 5D and outputs the decoded data as read data.

The decoding ROM 94 outputs the data decoded in accordance with the modulation rule to a data change-over circuit 110 on one hand and outputs a pointer (or a second protection detection signal 516) indicative of the inputting of a mismodulation pattern (or a pattern which is absent in the conversion table for 4/11 modulation shown in FIGS. 5A to 5D) to the previous-value holding circuit 100 on the other hand. This pointer indicates data of a "1" level when a mismodulation pattern is detected. The decoded data inputted to the data change-over circuit 110 is separated into read data 511 (or user data) and decoded access mark data 514 under the control of a data change-over signal 510 produced by the clock regenerating circuit 36. The decoded access mark data 514 is inputted to the previous-value holding circuit 100. When both the first protection detection signal 515 and the second protection detection signal 516 are of a level of "0", the previous-value holding circuit 100 outputs the decoded access mark data 514 as access mark data 512 to the track movement amount detecting circuit 40 as it is. When either the first protection detection signal 515 or the second protection detection signal 516 is of a level of "1", the previous-value holding circuit 100 outputs again the previously outputted access mark data 512 (or makes a previous-value holding operation), thereby preventing erroneous data from being inputted to the track movement amount detecting circuit 40. A signal 513 indicative of whether or not the previous-value holding operation is made is outputted to the control circuit 44 which in turn judges in accordance with the condition of access whether or not data subjected to the previous-value holding operation should be used.

Reference numeral 95 designates a tracking error operating circuit for receiving respective amplitude data of the paired wobbling pits in a sample mark from the A/D converter 50 to calculate a difference therebetween and to hold the calculated difference until the next sample mark. The output of the tracking error operating circuit 95 is inputted to the D/A converter 43.

Figure 20:
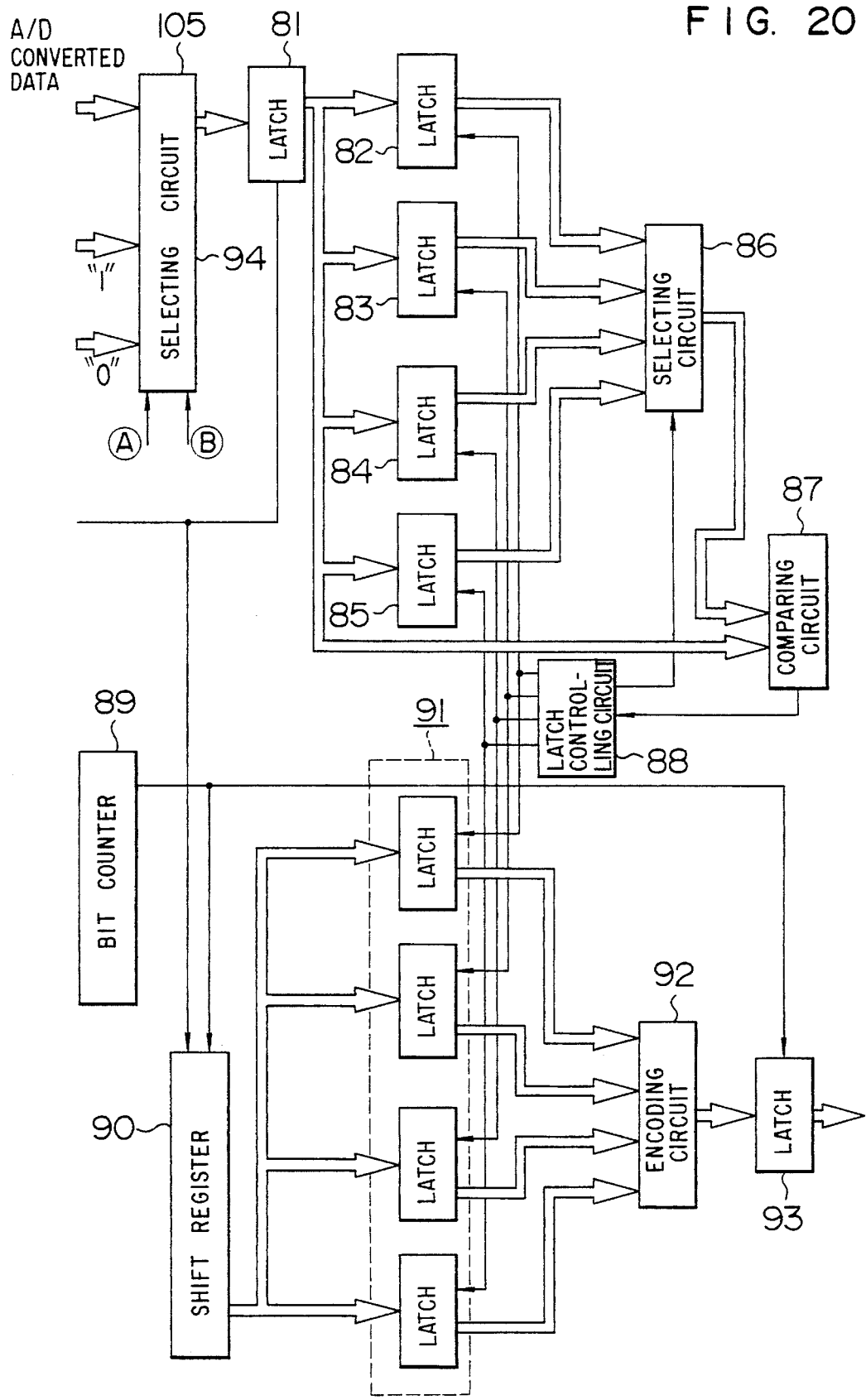
FIG. 20 is a detailed block diagram of another example of the differential circuit shown in FIG. 19.

FIG. 20 shows another example of the differential circuit 51 shown in FIG. 19. In this example, a selecting circuit 105 is connected to the input of the differential detection circuit shown in FIG. 18 so as to make a track position detection by use of the property of the modulation explained in conjunction with FIG. 4.

The selecting circuit 105 has three data inputs for A/D converted data indicating the amplitude value of a mark, data (for example, "1") quasi providing the maximum value of the mark and data (for example, "0".) quasi providing the minimum value of the mark, and two control inputs for data selection shown by and Ⓐ and Ⓑ. Normally, the selecting circuit 105 supplies the output of the A/D converter 50 to the latch circuit 81. The control input Ⓐ controls the selecting circuit 105 so as to supply the data "1" to the latch circuit 81 at the timing of the 11th transmission bit in a symbol including an access mark 11 in a sample mark position region. The control data Ⓑ controls the selecting circuit 105 so as to supply the data "0" to the latch circuit 81 at the timings of the 1st, 2nd, 9th and 10th transmission bits in the symbol including the access mark 11 in the sample mark position region. The differential detection circuit connected to the output of the selecting circuit 105 detects four mark positions in accordance with the operation explained in conjunction with FIG. 18 and supplies them to the protection circuit 96. In this time, as the effect of the selecting circuit, three marks are selected among the 3rd to 8th transmission bits in the symbol including the access mark and the positions of four marks including the three selected marks and the 11th transmission bit are detected. As a result, the detection under the premise that a mark is certainly positioned at the 11th transmission bit is realized and four marks can be detected from the access mark 11 with less probability of erroneous detection even under the conditions explained in conjunction with FIGS. 8A and 8B.

The data "0" input and the control input B may be omitted from the selecting circuit 105. In this case, three marks are selected among the 1st to 10th transmission bits and the positions of four marks including the three selected marks and the 11th transmission bit are detected. The result of detection is examined by the protection circuit 96 conjunction with FIG. 19. In the case where either one of the 1st, 2nd, 9th and 10th transmission bits is detected as a mark bit due to defects or the like, the detected symbol is judged as being a low-reliability mark, thereby making it possible to avoid the acceptance of a low-reliability access mark.

Figure 21:
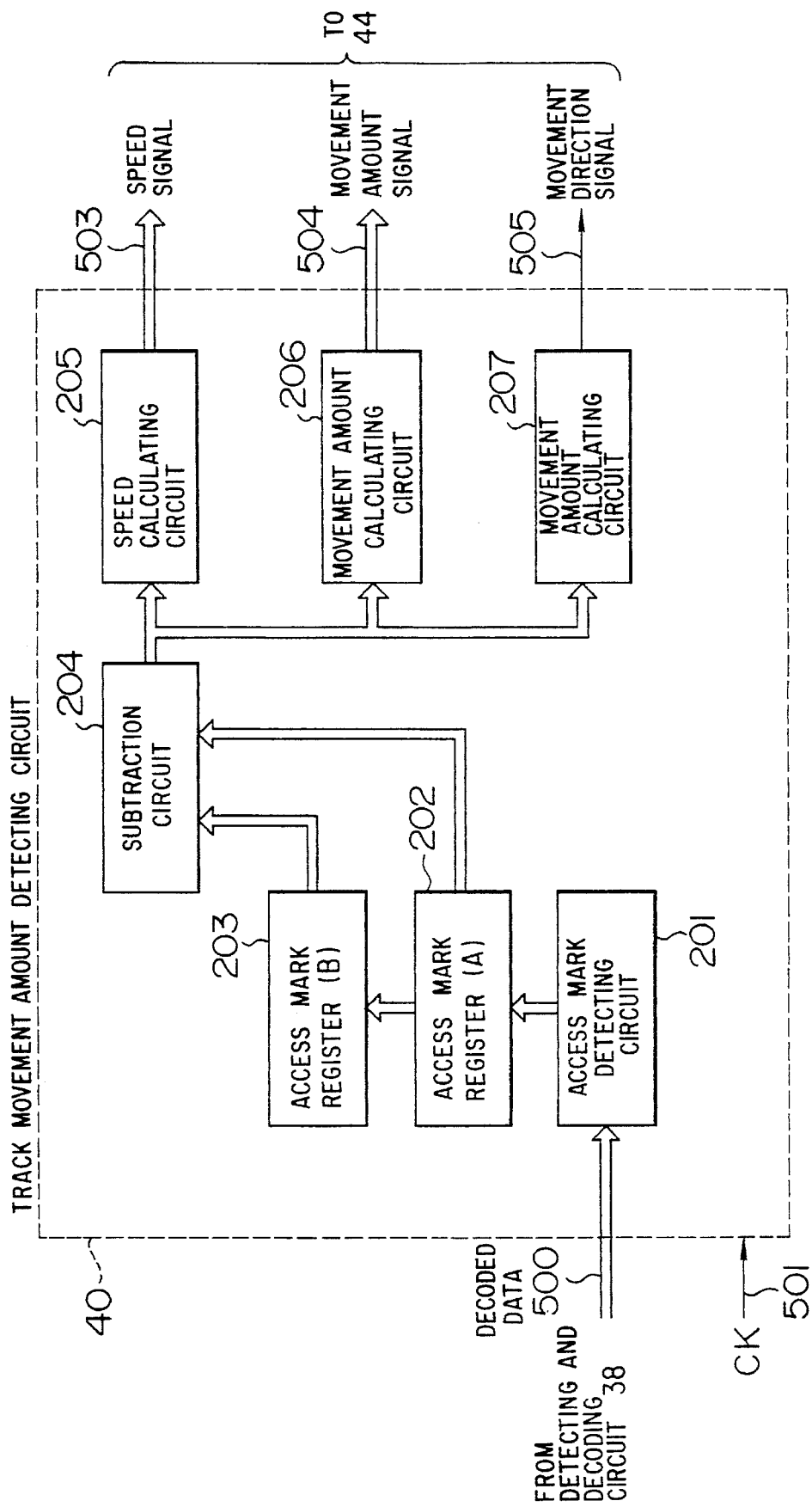
FIG. 21 is a detailed block diagram of a track movement amount detecting circuit used in the apparatus shown in FIG. 17.

FIG. 21 shows a block diagram of the track movement amount detecting circuit 40 shown in FIG. 17. The track movement amount detecting circuit 40 is controlled by segment clocks 501 outputted from the clock regenerating circuit 36. The track movement amount detecting circuit 40 calculates and outputs the values of a speed signal 503, a movement amount signal 504 and a movement direction signal 505 each time an access mark is detected. Reference numeral 201 designates an access mark detecting circuit. Access mark data outputted from the detecting and decoding circuit is taken into the access mark detecting circuit 201 under the control of the segment clocks 501. Since the decoding of data by the decoding ROM 94 follows the conversion table shown in FIGS. 5A to 5D, sixteen kinds of decoded access marks inputted to the access mark detecting circuit 201 take values as shown in FIG. 22A. In the access pattern detecting circuit 201, a conversion as shown in FIG. 22B is made in order to replace the sixteen kinds of access marks by numeric values of 0 to 15 in order from the outer circumference. Reference numeral 202 designates an access mark register (A) for storing the access marks replaced by the numeric values of 0 to 15. Numeral 203 designates an access mark register (B) into which the value stored in the access mark register (A) 202 is transferred when new data is taken into the access mark register (A) 202. Numeral 204 designates a subtraction circuit for making a subtraction in the system of residues of 16 for the value stored in the access mark register (A) 202 and the value stored in the access mark register (B) 203 to calculate a change in the amount of relative movement between the optical disk 1 and the optical pickup 21 in one segment. Numeral 205 designates a speed calculating circuit for making a calculation of x×p×f×n for a numeric value (x) inputted from the subtraction circuit 204 to determine the speed of relative movement between the optical disk 1 and the optical pickup 21 and to output the determined value as a speed signal 503. Here, p is the track pitch (1.5 μm in the present embodiment), n is the resolution of the access mark (1 in the present embodiment) and f is the segment clock frequency (about 50.1 kHz in the present embodiment). Numeral 206 designates a movement amount calculating circuit for accumulating the numeric values inputted from the subtraction circuit 204 to determine the amount of relative movement between the optical disk 1 and the optical pickup 21 in terms of the number of tracks and to output it as a movement amount signal 504. Numeral 207 designates a movement direction calculating circuit for determining the direction of relative movement between the optical disk 1 and the optical pickup 21 upon rotation at a low speed in accordance with the positiveness/negativeness of the sign of a numeric value inputted from the subtraction circuit 204 and to output it as a movement direction signal 505. Each of the movement amount (or the number of tracks), movement speed and movement direction referred to here shows only a component of the movement of the optical pickup 21 relative to the optical disk 1 in a direction of radius of the optical disk 1.

As apparent from the foregoing, in the present invention, a 3.5-inch optical disk can be realized by use of substantially the same techniques as the 5.25-inch sample servo optical disk including a recording material of the disk, the technique for fabrication of the disk, the optical pickup and the signal processing method. The data recording capacity is equal to or greater than 100 mega bytes. The servo characteristic is improved, thereby realizing a high reliability.

The track movement amount detection resolution is high as compared with the 5.25-inch optical disk and access marks allowing the detection of a track movement direction are realized. These marks make the reduction in circuit size possible by use of the same modulation as the signal, a protection against an erroneous detection is easily implemented by use of a modulation rule, and more stable and high-speed access is possible.

Further, a reliability in the decoding of an access mark for realizing a track access can be improved. More especially, an access mark can be stably decoded even if a read-out light spot makes a scan between tracks, and clocks can be stably regenerated even if a read-out light spot makes a scan between tracks.

We claim:

1. An optical information recording medium which has a disk-like shape and in/from which information can be optically recorded/reproduced along a virtual track virtually defined in a spiral or concentric circular form on the information recording medium following a predetermined modulation rule comprising:

a pair of wobbling pits provided for each predetermined data record unit, with a first and second wobbling pit being shifted in position in opposite radial directions, of the information recording medium with respect to a virtual track center; and an access pit group provided at a specified position in association with said pair of wobbling pits, said access pit group having at least three access pits different from said wobbling pits and being provided within a predetermined range of at least six contiguous pit positions, and at least one of said three access pits being disposed in a pit position which is different from pit positions of access pit groups provided for adjacent tracks;

wherein one of said at least three access pits in said access pit group excepting said leading wobbling pit has a positional change of two pit positions between tracks adjacent to each other in the radial direction of the information recording medium in accordance with a track-to-track transition, a plurality of said access pit groups are periodically repeated for every predetermined number of tracks in the radial direction of the information recording medium and a fixed access pit is interposed between the positions of said one pit before and after the change.

2. An optical information recording medium which has a disk-like shape and in/from which information can be optically recorded/reproduced along a virtual track virtually defined in a spiral or concentric circular form on the information recording medium following a predetermined modulation rule comprising:

a pair of wobbling pits provided for each predetermined data record unit, with a first and second wobbling pit being shifted in position in opposite radial directions, of the information recording medium with respect to a virtual track center; and an access pit group provided at a specified position in association with said pair of wobbling pits, said access pit group having at least three access pits different from said wobbling pits and being provided within a predetermined range of at least six contiguous pit positions, and at least one of said three access pits being disposed in a pit position which is different from pit positions of access pit groups provided for adjacent tracks;

wherein one of said at least three access pits in said access pit group excepting said leading wobbling pit has a positional change of three pit positions between tracks adjacent to each other in the radial direction of the information recording medium in accordance with a track-to-track transition, a plurality of said access pit groups are periodically repeated for every predetermined number of tracks in the radial direction of the information recording medium and two fixed access pits are interposed between the positions of said one pit before and after the change.

3. An optical information recording medium which has a disk-like shape and in/from which information can be optically recorded/reproduced along a virtual track virtually defined in a spiral or concentric circular form on the information recording medium following a predetermined modulation rule comprising:

a pair of wobbling pits provided for each predetermined data record unit, with a first and second wobbling pit being shifted in position in opposite radial directions, of the information recording medium with respect to a virtual track center; and an access pit group provided at a specified position in association with said pair of wobbling pits, said access pit group having at least three access pits different from said wobbling pits and being provided within predetermined range of at least six contiguous pit positions, and at least one of said three access pits being disposed in a pit position which is different from pit positions of access pit groups provided for adjacent tracks; and a predetermined train of inter-track pits provided between tracks adjacent to each other in a radial direction of the information recording medium and being positioned between said access pit groups provided on the adjacent tracks.

4. An optical information recording medium according to claim 3 wherein:

said predetermined train of inter-track pits provided between the adjacent tracks includes a group of pits disposed at positions which are equivalent in a circumferential direction to said at least three access pits provided on one of the adjacent tracks.

5. An optical information recording medium according to claim 3 wherein:

said predetermined train of inter-track pits includes a group of pits disposed on respective lines which connect said at least three access pits provided on one of the adjacent tracks on an inner circumference side of said predetermined train in the radial direction of the information recording medium and said at least three access pits provided on the other adjacent track on an outer circumference side of said predetermined train in the radial direction of the information recording medium.

6. A recording/reproducing apparatus for recording/reproducing information in/from a disk-like optical information recording medium in/from which information is optically recorded/reproduced along a virtual track virtually defined in a spiral or concentric circular form on said optical information recording medium and on which there are preliminarily arranged a pair of wobbling pits which are provided for each predetermined data record unit and having a first and second wobbling pit shifted in position in opposite radial directions of the information recording medium with respect to a virtual track center and an access mark including at least three access pits and a leading one of said pair of wobbling pits, said at least three access pits being provided within a predetermined range of at least six contiguous pit positions and at least one of said at least three access pits being disposed in a pit position which is different from pit positions of access marks provided for adjacent tracks and pit positions of said access mark following a predetermined modulation rule applied to a recording of information in the information recording medium comprising:

an optical system for irradiating said optical information recording medium with write-in light modulated on the basis of externally inputted recording information to record information and irradiating said optical information recording medium with reproduction light to detect light reflected therefrom and output a reproduced signal;

a detecting and decoding circuit for receiving the reproduced signal outputted from said optical system and for operating as a reproducing circuit for reproducing a recorded signal and as a demodulating circuit for detecting a position of said access mark on said optical information recording medium on a basis of a decoding method corresponding to said predetermined modulation rule applied to a recording of information in said optical information recording medium; and a movement amount detecting circuit for receiving the mark position from said detecting and decoding circuit to detect a change in relative position between a reproduced position on said optical information recording medium and said optical system;

wherein said detecting and decoding circuit includes a protection circuit for outputting a signal indicating that a detected and decoded signal output of said detecting and decoding circuit is a mismodulation pattern upon detection that an access mark obtained by the detected and decoded signal output of said detecting and decoding circuit violates said predetermined modulation rule applied to a recording of information.

7. An optical information recording medium which has a disk-like shape and in/from which information can be optically recorded/reproduced along a virtual track virtually defined in a spiral or concentric circular form on the information recording medium following a predetermined modulation rule comprising:

a pair of wobbling pits provided for each predetermined data record unit, with a first and second wobbling pit being shifted in position in opposite radial directions, of the information recording medium with respect to a virtual track center; and an access pit group provided at a specified position in association with said pair of wobbling pits, said access pit group having three access pits different from said wobbling pits and being provided within a predetermined range of six contiguous pit positions, and at least one of said three access pits being disposed in a pit position which is different from pit positions of access pit groups provided for adjacent tracks;

wherein one of said three access pits in said access pit group excepting said leading wobbling pit has a positional change of two pit positions between tracks adjacent to each other in the radial direction of the information recording medium in accordance with a track-to-track transition, a plurality of said access pit groups are periodically repeated for every predetermined number of tracks in the radial direction of the information recording medium and a fixed access pit is interposed between the positions of said one pit before and after the change.

8. An optical information recording medium which has a disk-like shape and in/from which information can be optically recorded/reproduced along a virtual track virtually defined in a spiral or concentric circular form on the information recording medium following a predetermined modulation rule comprising:

a pair of wobbling pits provided for each predetermined data record unit, with a first and second wobbling pit being shifted in position in opposite radial directions, of the information recording medium with respect to a virtual track center; and an access pit group provided at a specified position in association with said pair of wobbling pits, said access pit group having three access pits different from said wobbling pits and being provided within a predetermined range of six contiguous pit positions, and at least one of said three access pits being disposed in a pit position which iS different from pit position of access pit groups provided for adjacent tracks;

wherein one of said three access pits in said access pit group excepting said leading wobbling pit has a positional change of three pit positions between tracks adjacent to each other in the radial direction of the information recording medium in accordance with a track-to-track transition, a plurality of said access pit groups are periodically repeated for every predetermined number of tracks in the radial direction of the information recording medium and two fixed access pits are interposed between the positions of said one pit before and after the change.

9. A recording/reproducing apparatus for recording/reproducing information in/from a disk-like optical information recording medium in/from which information is optically recorded/reproduced along a virtual track virtually defined in a spiral or concentric circular form on said optical information recording medium and on which there are preliminarily arranged a pair of wobbling pits which are provided for each predetermined data record unit and having a first and second wobbling pit shifted in position in opposite radial directions of the information recording medium with respect to a virtual track center and an access mark including three access pits and a leading one of said pair of wobbling pits, said three access pits being provided within a predetermined range of six contiguous pit positions and at least one of said three access pits being disposed in a pit position which is different from pit positions of access marks provided for adjacent tracks and pit positions of said access mark following a predetermined modulation rule applied to a recording of information in the information recording medium comprising:

an optical system for irradiating said optical information recording medium with write-in light modulated on the basis of externally inputted recording information to record information and irradiating said optical information recording medium with reproduction light to detect light reflected therefrom and output a reproduced signal;

a detecting and decoding circuit for receiving the reproduced signal outputted from said optical system and for operating as a reproducing circuit for reproducing a recorded signal and as a demodulating circuit for detecting a position of said access mark on said optical information recording medium on a basis of a decoding method corresponding to said predetermined modulation rule applied to a recording of information in said optical information recording medium; and a movement amount detecting circuit for receiving the mark position from said detecting and decoding circuit to detect a change in relative position between a reproduced position on said optical information recording medium and said optical system;

wherein said detecting and decoding circuit includes a protection circuit for outputting a signal indicating that a detected and decoded signal output of said detecting and decoding circuit is a mismodulation pattern upon detection that an access mark obtained by the detected and decoded signal output of said detecting and decoding circuit violates said predetermined modulation rule applied to a recording of information.

* * * * *